United States Patent
Miyawaki et al.

[11] Patent Number: 6,160,900
[45] Date of Patent: *Dec. 12, 2000

[54] METHOD AND APPARATUS FOR REDUCING THE PROCESSING TIME REQUIRED IN MOTION VECTOR DETECTION

[75] Inventors: Mamoru Miyawaki, Isehara; Katsuhisa Ogawa, Machida, both of Japan

[73] Assignee: Canon Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/382,533

[22] Filed: Feb. 2, 1995

[30] Foreign Application Priority Data

Feb. 4, 1994 [JP] Japan ...................... 6-012663
Oct. 28, 1994 [JP] Japan ...................... 6-265058

[51] Int. Cl.⁷ ........................................ G06K 9/00
[52] U.S. Cl. ..................... 382/107; 382/251; 348/402; 348/415
[58] Field of Search ............................. 382/213, 236, 382/107, 251, 253; 348/402, 407, 413, 416, 699, 208, 452, 420, 409, 700, 415, 443, 390

[56] References Cited

U.S. PATENT DOCUMENTS

| | | | |
|---|---|---|---|
| 4,490,851 | 12/1984 | Gerhart . | |
| 4,569,079 | 2/1986 | Yoshida | 382/1 |
| 4,667,233 | 5/1987 | Furukawa | 358/136 |
| 4,975,978 | 12/1990 | Ando | 382/104 |
| 5,173,772 | 12/1992 | Choi | 348/416 |
| 5,212,547 | 5/1993 | Otsuki | 348/416 |
| 5,280,530 | 1/1994 | Trew | 382/103 |
| 5,398,068 | 3/1995 | Liu | 348/416 |
| 5,589,993 | 12/1996 | Naimpally | 348/390 |

FOREIGN PATENT DOCUMENTS 624981  11/1994  European Pat. Off. ......... H04N 7/13

OTHER PUBLICATIONS

T. Shibata et al., "A Functional MOS Transistor Featuring Gate–Level Weighted Sum and Threshold Operations," IEEE Transactions on Electron Devices, vol. 39, No. 6, Jun. 1992, pp. 1444–1455.

*Primary Examiner*—Jose L. Couso
*Assistant Examiner*—Matthew C. Bella
*Attorney, Agent, or Firm*—Fitzpatrick, Cella, Harper & Scinto

[57] ABSTRACT

A data processing method investigates second data series of a second data group relative to a first data series in a first data group to reduce processing requirements of motion vector detection. The method includes a first step for selecting an area including the second data series of the second data group based on a determination condition as to whether a function of a difference between the first data series and the second data series is within a first desired value and a second step for further selecting other data series in the selected area based on another determination condition as to whether a function of a difference between the other data series in the defined area and the first data series is within a second desired value less than the first desired value.

13 Claims, 32 Drawing Sheets

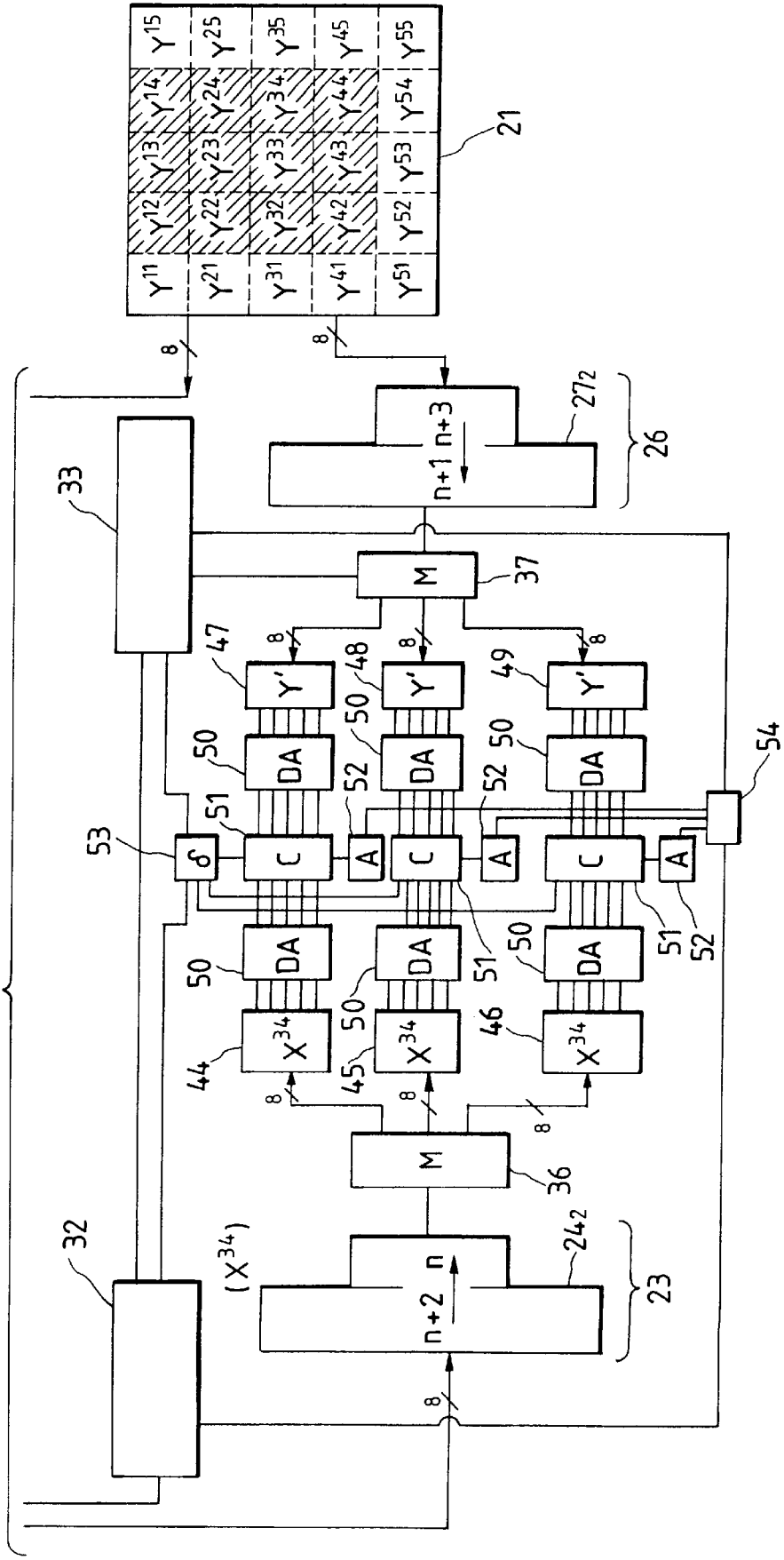

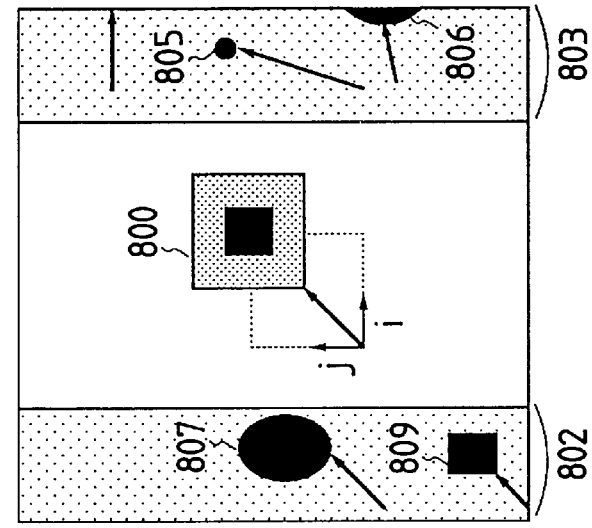
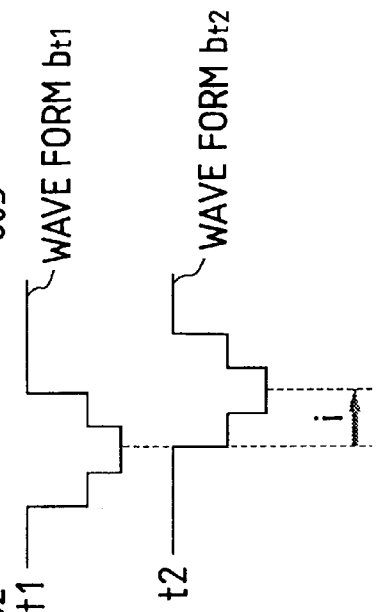
FIG. 19A
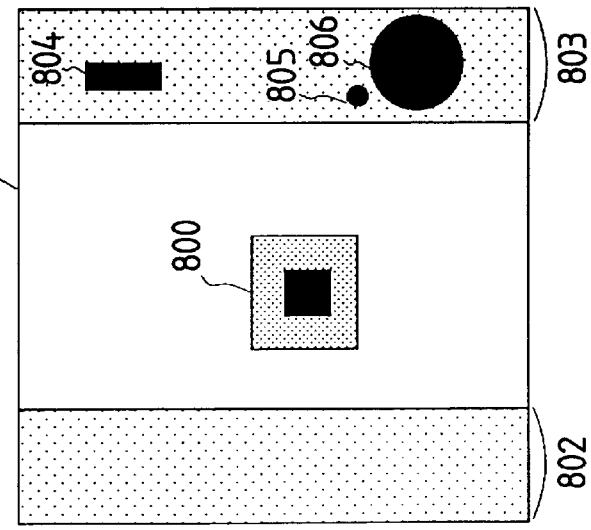
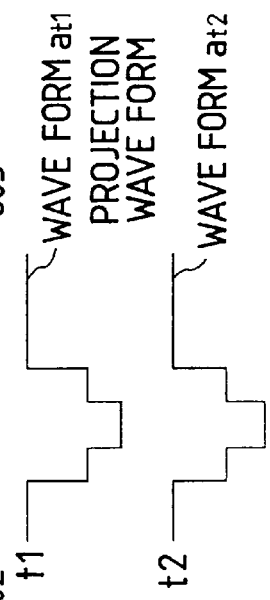
FIG. 19B

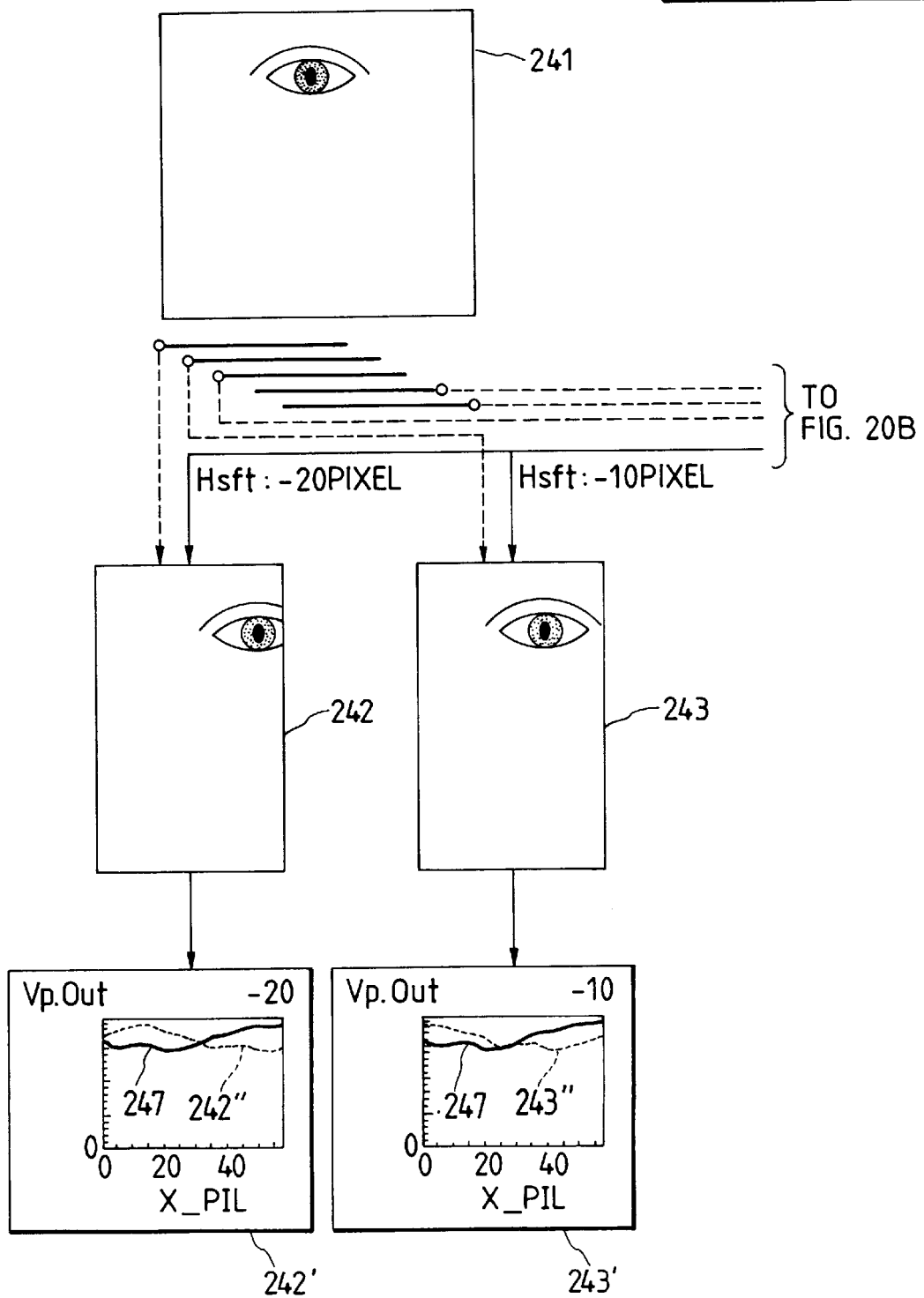

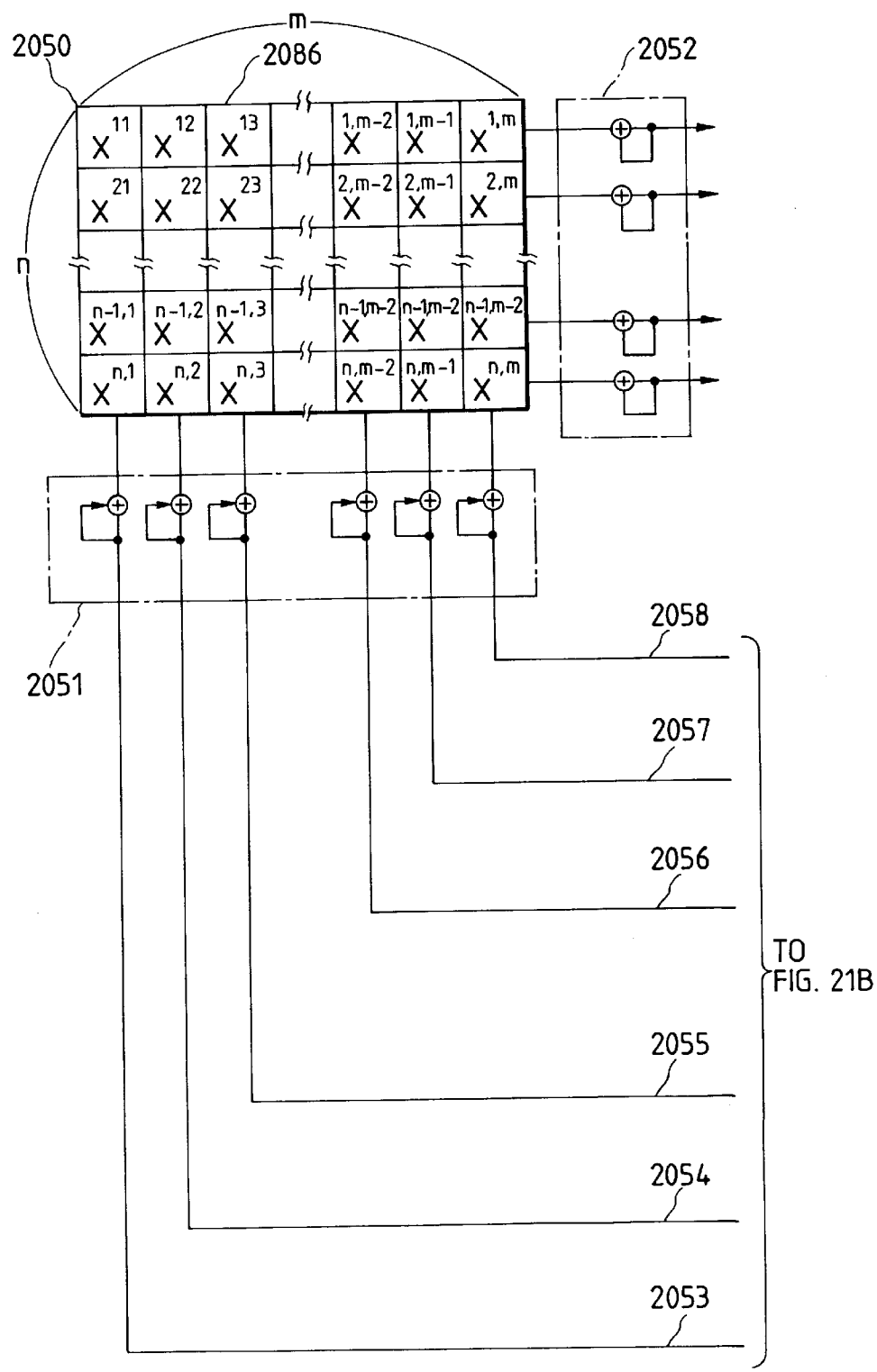

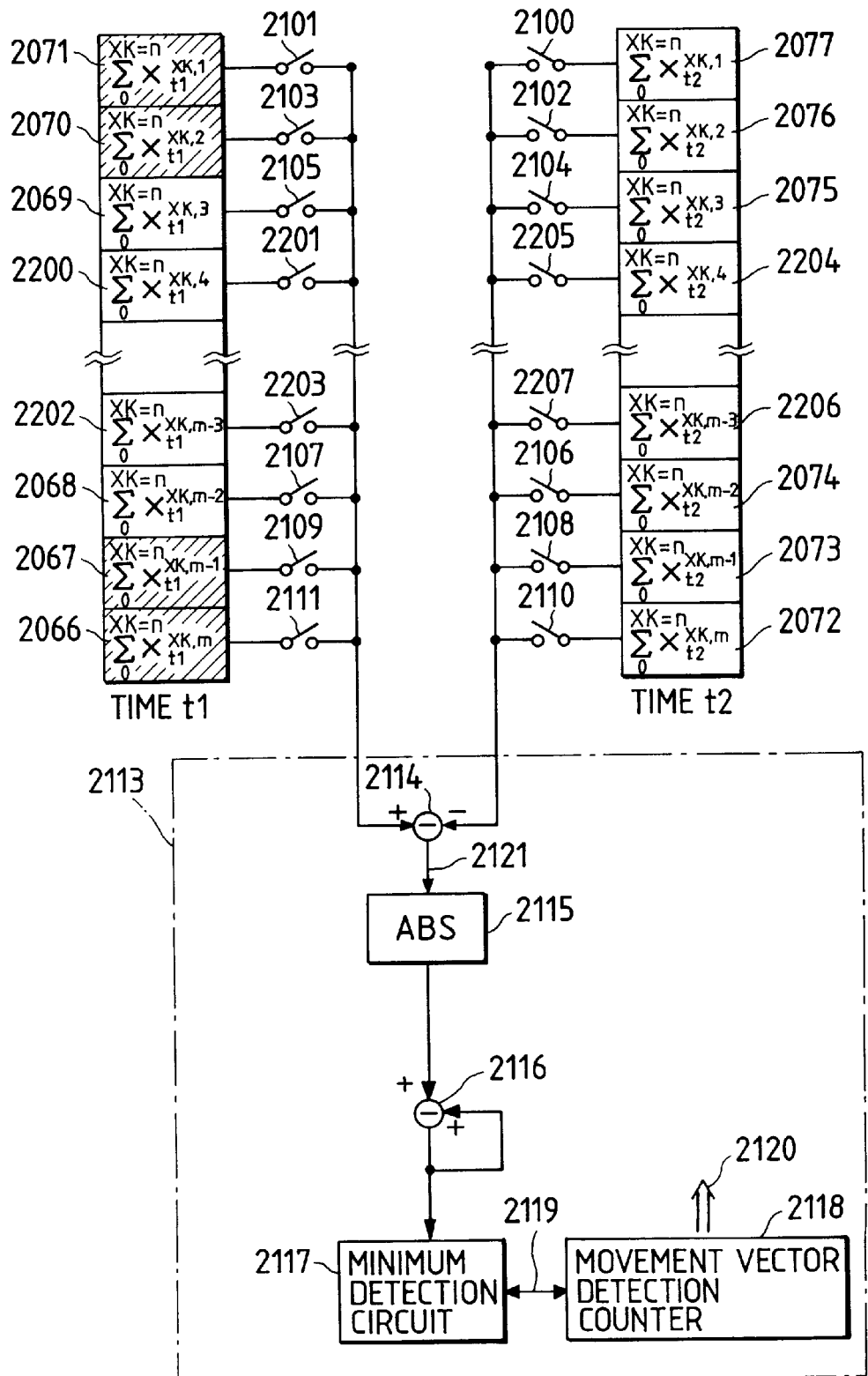

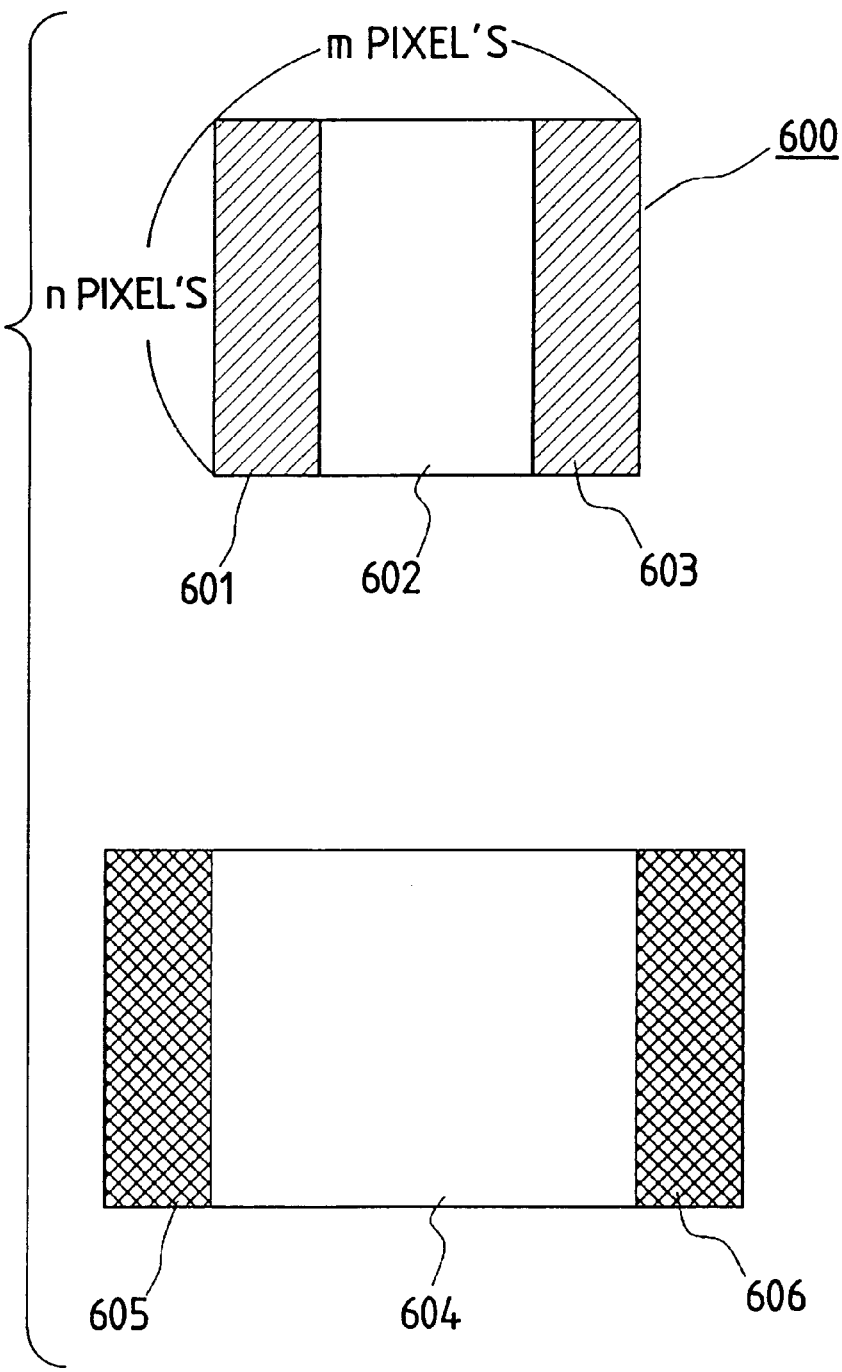

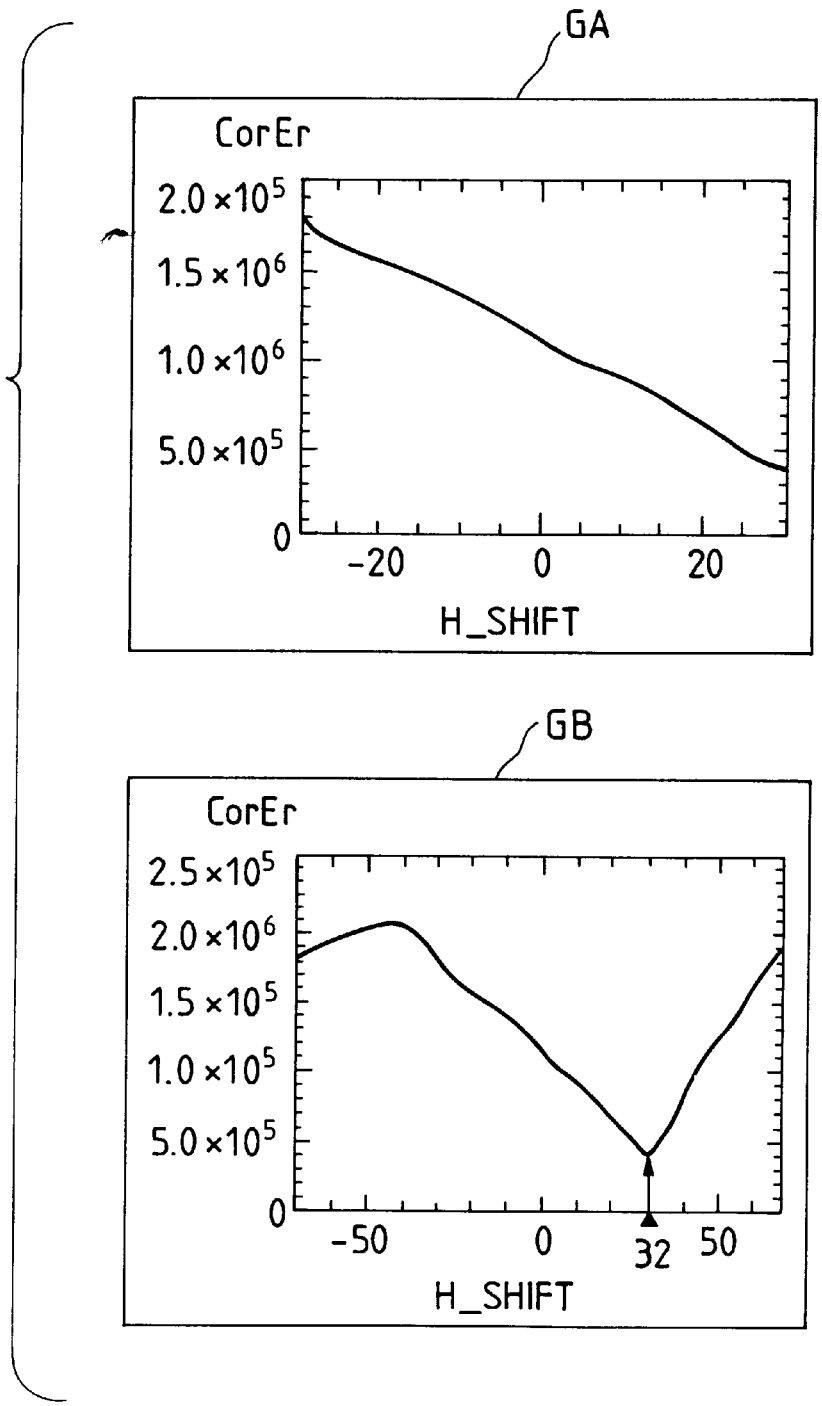

METHOD AND APPARATUS FOR REDUCING THE PROCESSING TIME REQUIRED IN MOTION VECTOR DETECTION

BACKGROUND OF THE INVENTION

1. Field of the Invention

The present invention relates to a data processing method and a data processor utilized in image information processing apparatuses, such as a television receptor, a video camera recorder, a computer and a facsimile.

2. Related Background Art

In recent years, multimedia equipments have been developed actively in company with the progress of personal computers, liquid crystal display devices and communication techniques. One of factors in that the input of image information has been made possible is compression/expansion technique for image data.

With moving picture image compression processing, MPEG2 (Moving Picture Image Coding Experts Group Phase 2) is currently being promoted for its standardization, being featured by time directional redundancy reduction according to movement compensation, compression of space redundancy according to DCT (Discrete Cosine Transform) and coding quantity compression according to Huffman coding (variable length coding), but it needs an enormous processing quantity in movement vector detection processing especially necessary for the movement compensation.

Hereinbelow, a conventional movement vector detecting method (block matching method) will be described in brief.

FIG. 1 is a diagram illustrating a block matching method. In FIG. 1, a frame image 700 at time t1 is called a preceding frame image and another frame image 701 at time t2 is called a current frame due to the relationship of t1<t2.

In the block matching method, the current frame image 701 is divided into small block units and investigated in each block unit to select an image block correlative with the preceding frame image most strongly.

A standard image block 703 is selected from the current frame image 701 and it is defined by about 16×16 pixels, for example, in MPED2 etc. The image block showing the closest correlation with the preceding frame image 700 is obtained from a correlational arithmetic operation in an investigation area 704 designated inside the preceding frame image 700.

As a result of the correlational arithmetic operation, assuming that an image block 705 correlative with the standard image block 703 most strongly was detected in the investigation area 704 defined inside the preceding frame image 700. In this case, a difference in spatial position between the image block 705 and the standard image block 703 is calculated to determine a movement vector 706.

The block matching method mentioned above calculates a difference error between unit pixels and accumulates the entire error existing inside a predetermined investigation area to memorize the accumulated error as a correlation error value of the above investigation area. Then, the method investigates the highest correlational block in comparison with correlation error values of other investigation areas to calculate the movement vector from the positional relation with the preceding frame.

Thus, the block matching method is based on the difference error between the unit pixels so that the method has needed an enormous quantity of the arithmetic operation in the movement vector detection.

For example, in case of NTSC signal according to the current television broadcast, if the standard block is defined by 16×16 pixels and the search range is ±16 pixels, the arithmetic operation quantity is about 20 Mbps. Also, in case of a movement vector corresponding to a larger movement, e.g., of ±100 pixels, the processing ability exceeds several Tbps and this makes it difficult to be processed in one chip LSI even though a parallel processing technique is used. Accordingly, the realization of a low-cost LSI has been impossible.

Such an image processing, e.g., a tracking processing of a high-speed moving body, is particularly required to enlarge its investigation area and this has caused an error detection due to a delay in the arithmetic operation processing.

SUMMARY OF THE INVENTION

A first object of the present invention is to solve the above technical problems and to provide a correlation algorithm enabling to be carried out at high-speed and with high accuracy in order to accomplish the algorithm effectively.

A second object of the present invention is to provide some applied forms, such as movement detection processing, distance measurement processing and pattern recognition, which can be widely applied to the moving picture processing.

A third object of the present invention is to provide a data processing method for comparing a first data group with a second data group, the data processing method characterized in that a data subgroup is selected from at least one data group out of the first and second data groups to perform an arithmetic operation for comparing the selected data subgroup to the other data group.

A fourth object of the present invention is to perform a correlational arithmetic operation between data of the first and second groups along steps from a rough search to a high accurate search in the same circuit structure.

A fifth object of the present invention is to provide an arithmetic operating method, in which there include a first and a second data groups, and a data series most similar to a third series existing in the first data group is investigated from the second data group, the method at least including a first step for selecting data series existing in the second data group based on a determination condition as to whether a function of a difference between the third data series and each data series in the second data group is within a first desired value, and a second step for further selecting the data series in an area defined inside the second data group based on another determination condition as to whether the function of the deference between the third data series and each of the selected data series in the defined area is within a second value less than the first value.

A sixth object of the present invention is to provide a data processing method including an image input means and a storage means for storing the image information input to the input means, the method characterized in that a movement information storage means is further included for storing movement information having less information quantity than that of the image information stored in the storage means so that the stored image information is processed according to the stored movement information.

A seventh object of the present invention is to provide a method in which an analog arithmetic operation can be performed in a correlational arithmetic operation part and change the weight of correlational existence freely so as to carry out the arithmetic operation with simple and only a few devices, so that parallel processing can be performed at a high speed and with a small chip in comparison with the conventional method, thereby widely being applied to low-cost personal equipments.

An eighth object of the present invention is to provide a data processing method, in case that a correlational arithmetic operation is performed between a first selection area selected from a first data group and a second selection area selected from a second data group, characterized in that part of the first selection area is masked to perform the correlational arithmetic operation, with standardizing the first selection area except the masked part, for the same data length between the standard first selection area and the second selection area.

A ninth object of the present invention is to provide an apparatus including an input means for inputting image data, a masking means for masking part of the input image data, an arithmetic operation means for performing an operation of the accumulated sum of the input image data along the horizontal and vertical directions and a detection means for detecting the movement between picture planes based on the accumulated sum of the image data except the part masked by the masking means.

A tenth object of the present invention is to provide a method, in case that a correlational arithmetic operation is performed between a first selection area selected from a first data group and a second selection area selected from a second data group, characterized in that part of the first selection area is masked; dummy data is added to the second selection area; and the correlational arithmetic operation is performed, with standardizing the first selection area except the masked part, for the same data length between the standard first selection area and the second selection area the dummy data added.

In the present invention, it is preferable to use a MOS type device including a plurality of input gates and a common floating gate coupled in capacitance to the input gates. According to the above invention, the correlation between data can be detected with high accuracy and at a high speed by use with a simple circuit structure in comparison with the conventional art.

BRIEF DESCRIPTION OF THE DRAWINGS

FIG. 19A and FIG. 19B are diagrams illustrating a movement vector detecting method according to a seventh embodiment of the present invention;

FIG. 22 is a diagram illustrating details of the correlational arithmetic operation of FIGS. 21A, 21B and 21C;

FIG. 28 is a diagram illustrating a movement vector detecting method according to an eighth embodiment of the present invention; and FIG. 29 is a diagram illustrating a correlation error function according to the fourth embodiment and a correlation error function according to the eighth embodiment of the present invention.

DETAILED DESCRIPTION OF THE PREFERRED EMBODIMENTS

Figure 2:
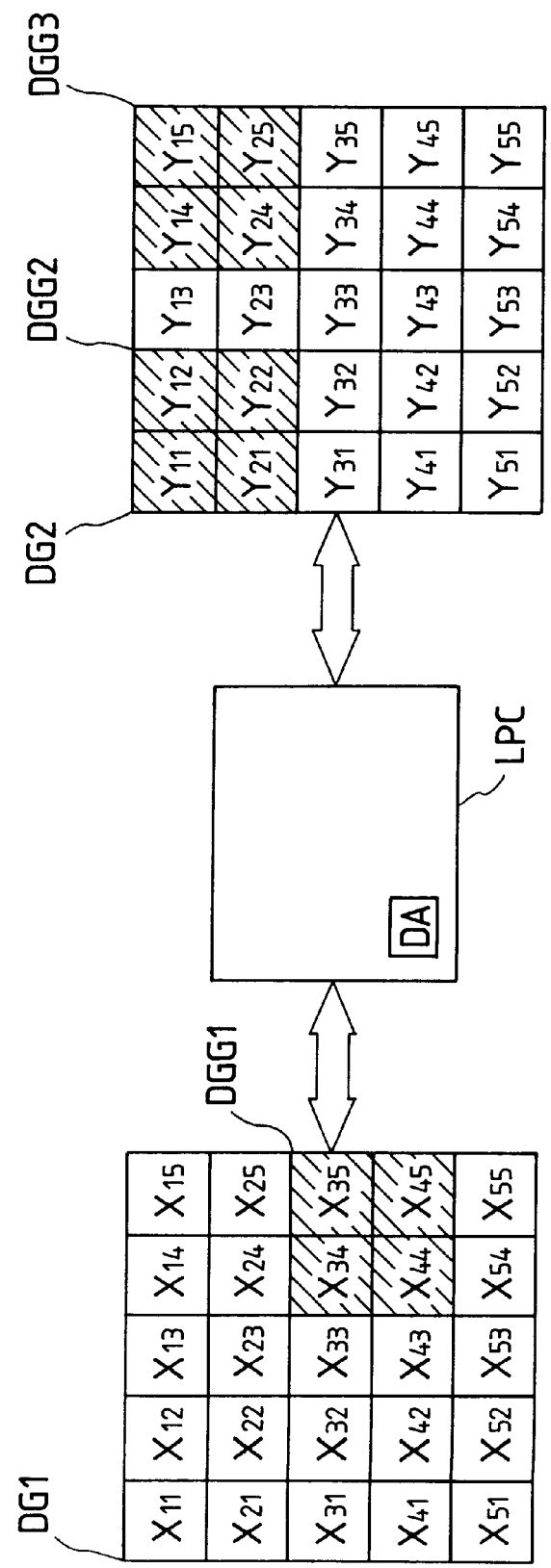
FIG. 2 is a diagram illustrating a data processing method of the present invention.

FIG. 2 is a schematic diagram illustrating a data processing method according to an embodiment of the present invention. Reference numeral DG1 indicates 1 frame data Xij; of n×m (n=5, m=5) in number constituting a first data group and reference numeral DG2 indicates 1 frame data Yij of n×m (n=5, m=5) in number constituting a second data group. Reference numerals DGG1, DGG2 and DGG3 indicate selection areas of 2×2 matrices, respectively. A data processing circuit LPC performs comparison/arithmetic-operation processings, including a converter (D/A) and unillustrated elements, such as an investigation area setting means, a data thinning-out means, an adding means, determination means and determination condition setting means.

Referring to FIG. 2, a processing system according to the embodiment of the present invention will be described with respect to a movement detection as an exemplar. In FIG. 2, the data Xij ($1 \leq i \leq n$, $1 \leq j \leq m$) is designated as the first frame data at the time t1 and the data Yij ($1 \leq i \leq n$, $1 \leq j \leq m$) is designated as the second frame data at the time t2. Times t1 and t2 show a relationship of t1<t2. Now, assuming that an area defined inside the data Xij, e.g., an area (x34, x44, x35, x45) is investigated as to where image data on the above area moved at time t2. In this case, an investigation area yk1 ($k \leq n$, $1 \leq m$) is first designated out of the second frame data Yij.

Most preferably, although the image data should be searched through the entire area, if the investigation area is limited to a possible area on which the image data to be processed would move from time t1 to time t2, the number of arithmetic operations can be reduced by data on the non-investigation area. In the conventional method, the arithmetic operation has been performed with respect to all the data series corresponding to the area (x34, x44, x35, x45) out of the above investigation area yk1 and this has caused an enormous arithmetic operation circuit. On the other hand, the present invention thins out selection areas out of the above investigation areas to select y data series. In this embodiment, the areas to be investigated are selected, with shifting by 3 pixels respectively along the horizontal and vertical directions, e.g., (y11, y21, y12, y22), (y14, y24, y15, y25), etc.

Digital/analog conversion (D/A conversion) is then performed with respect to the pixels on the selected areas. After conversion, the arithmetic operation is performed as follows:

for example, as to the series of (y11, y21, y12, y22), $$\left.\begin{aligned}&\text{if } |X_{34} - Y_{11}| < \delta_1, &\Delta^1_1 = 1\\&\text{if not,} &\Delta^1_1 = 0\\&\text{if } |X_{44} - Y_{21}| < \delta_1, &\Delta^1_2 = 1\\&\text{if not,} &\Delta^1_2 = 0\\&\text{if } |X_{35} - Y_{12}| < \delta_1, &\Delta^1_3 = 1\\&\text{if not,} &\Delta^1_3 = 0\\&\text{if } |X_{45} - Y_{22}| < \delta_1, &\Delta^1_4 = 1\\&\text{if not,} &\Delta^1_4 = 0\end{aligned}\right\} \quad (1)$$

Similarly, as to the series of (y14, y24, y15, y25), $$\left.\begin{aligned}&\text{if } |X_{34} - Y_{14}| < \delta_1, &\Delta^2_1 = 1\\&\text{if not,} &\Delta^2_1 = 0\\&\text{if } |X_{44} - Y_{24}| < \delta_1, &\Delta^2_2 = 1\\&\text{if not,} &\Delta^2_2 = 0\\&\text{if } |X_{35} - Y_{15}| < \delta_1, &\Delta^2_3 = 1\\&\text{if not,} &\Delta^2_3 = 0\\&\text{if } |X_{45} - Y_{25}| < \delta_1, &\Delta^2_4 = 1\\&\text{if not,} &\Delta^2_4 = 0\end{aligned}\right\} \quad (2)$$

At first, the arithmetic operation mentioned above is performed with respect to a data series primarily selected out of the above investigation area yk1, then, the adding processing is made in each data series.

Figure 1:
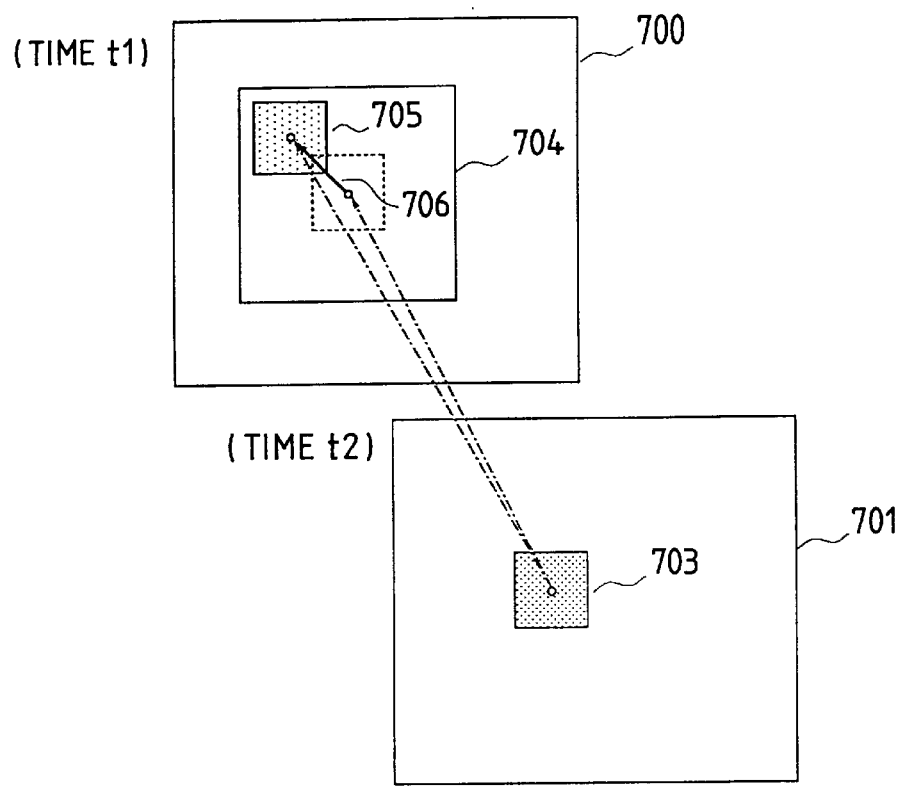
FIG. 1 is a diagram illustrating a movement vector detection according to a conventional block matching method.
Figure 3:
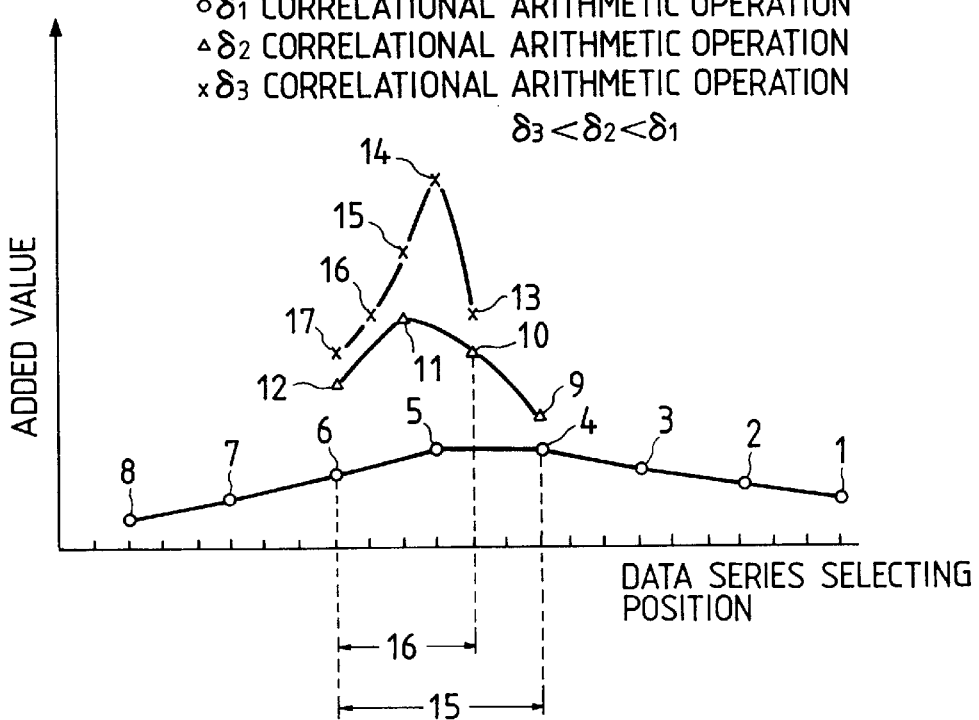
FIG. 3 is a graph illustrating an arithmetic operation processing in a first embodiment of the data processing according to the present invention.

FIG. 3 shows data of added values $\Sigma_i \Delta^1_i, \Sigma_i \Delta^2_i, \ldots \Sigma_i \Delta^P_i$ at points 1 to 8. In FIG. 3, point 1 is for the value of $\Sigma_i \Delta^1_i$ and point 2 is for the value of $\Sigma_i \Delta^2_i$. In this case, the added value is maximized at point 5 and becomes smaller in order of p=4, p=6. In this embodiment, a range of added values corresponding to the third biggest one and more, as shown in a range 15 (a width 15 designated between arrows), were determined as selection areas for the next data series. As a result, the arithmetic operation range can be limited. Then, data series corresponding to the series of (y34, y44, y35, y45) are selected out of the second investigation area y'k1 discussed above to perform the arithmetic operation in the same manner as that of the last time. This time differs from the last time in that the determination conditions δ expressing correlational existence shown in equations (1) and (2) are narrowed in comparison with those of the last time to improve the operational accuracy and that the spacing of selection is also narrowed in the selection of data series. In this embodiment, the selection areas to be searched were selected, with shifting the spacing of selection by 2 pixels. The results of this case are shown in FIG. 3.

The resulting data of the second arithmetic operation performed by the determination conditions $\delta_2$ are shown at points 9 to 12. In this case, the added value is maximized in data series shown at point 11 and becomes smaller in order of p=10, p=12, so that the investigation area 16 can be limited at this time as well as last time. Accordingly, in the further limited range, the third determination conditions $\delta_3$ were made still narrower than the second conditions to perform the third correlational arithmetic operation. As a result, the position shown at point 14 of FIG. 3 was determined to be correlative with the series of (y34, y44, y35, y45) most strongly and the movement vector was able to be calculated.

In this embodiment, although the description was made only as to the certain area (y34, y44, y35, y45), it is needless to say that these arithmetic operations are developed in parallel over a plurality of areas. Also, although the outputs resulting from the determination conditions were represented as "1" and "0", the present invention is not limited thereto and multivalued outputs can be calculated.

As described in the above algorithm, this system is featured by that the correlational arithmetic operations are proceeded in steps, and besides, that the correlational arithmetic operations themselves flexibly change in each step.

As shown in FIG. 3, as the determination conditions are made wider, changes of an evaluation function (an added value in this system), being not in the optimum value, become smaller, but the changes spread over a wide area.

Accordingly, it is preferable to roughly investigate possible areas on which the optimum value could exist. Alternatively, in the conventional system, when the investigation was performed sporadically, the evaluation function, being slightly shifted from the optimum value, scarcely changes, but it changes rapidly only near by the optimum value, so that it was possible to lose the area on which the optimum value exists. For these reasons mentioned above, this system according to the present invention was able to perform the correlational arithmetic operations at a high speed and with high accuracy.

Figure 4:
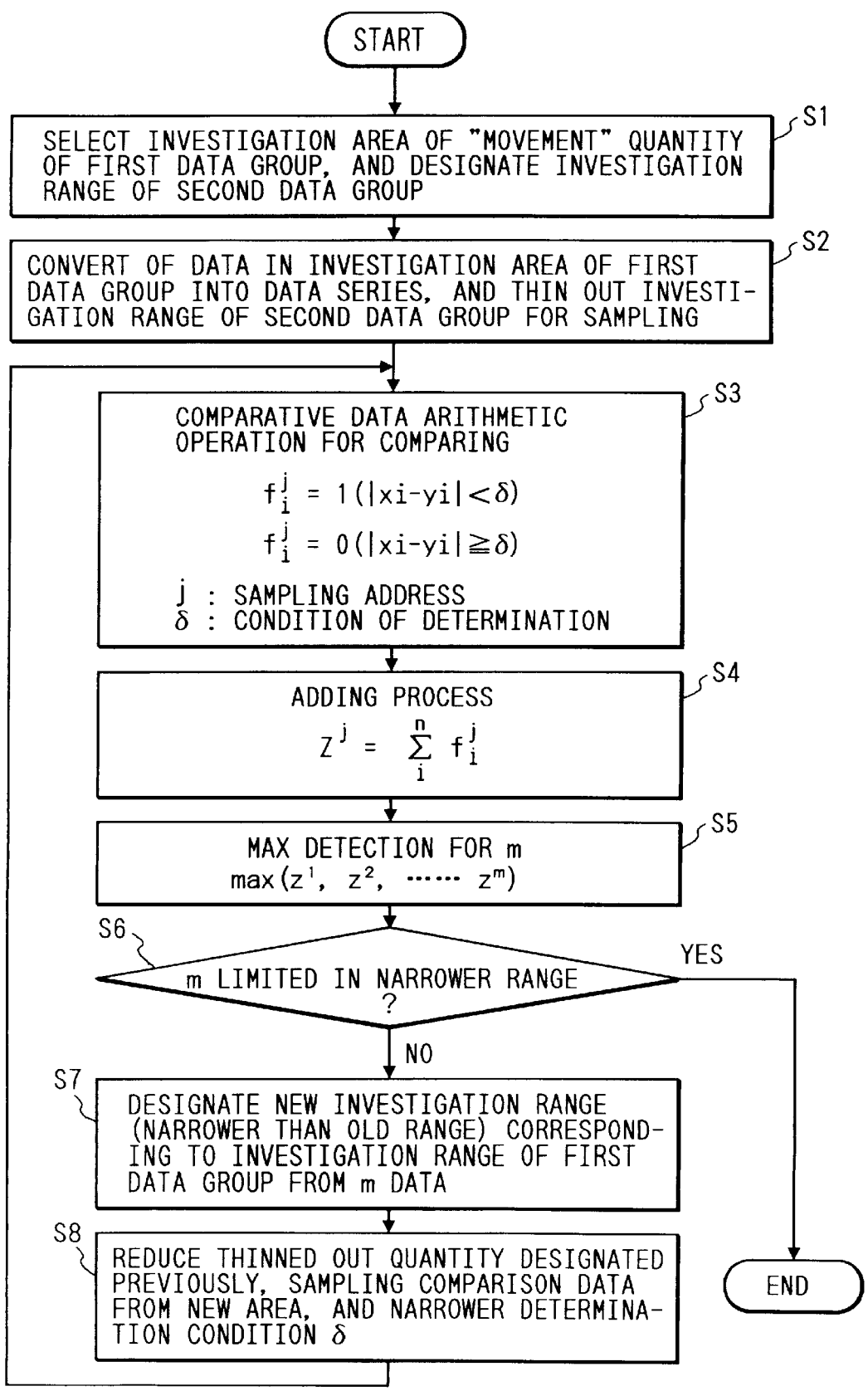
FIG. 4 is a flow chart illustrating the data processing of the present invention.
Figure 5:
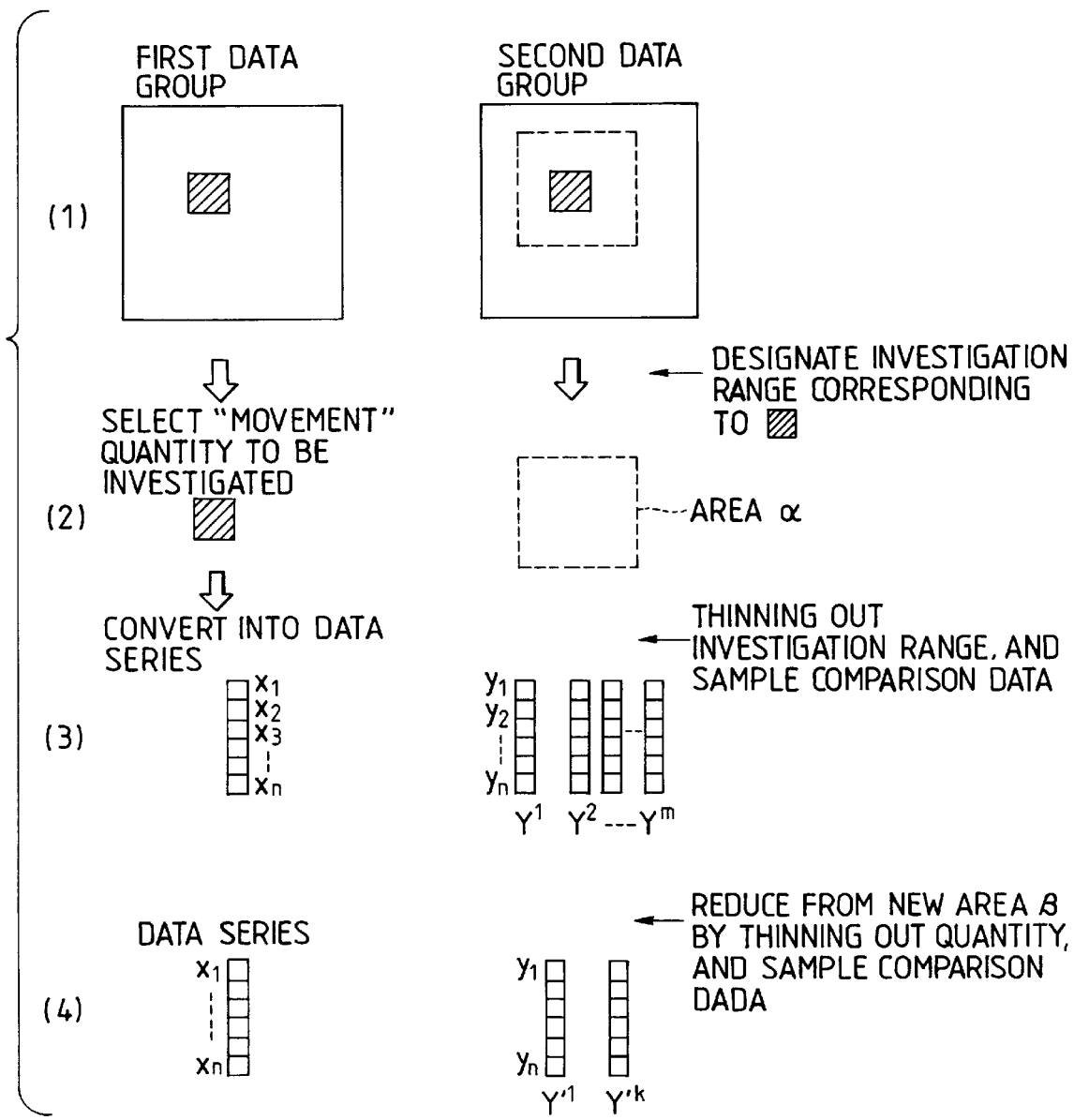
FIG. 5 is a diagram explaining the flow chart of FIG. 4.

FIG. 4 is a flow chart of the processing system according to the present invention mentioned above. Here, to ease understanding, steps S1 and S2 are described at (1) to (3) of FIG. 5 and step S8 is also described at (4) of FIG. 5. As an aside, the embodiment of the arithmetic operation system discussed above took the absolute value of the difference between the data series out of the data xij in the first frame and the corresponding data series on the investigation area defined inside the data yij of the second frame, but it is possible to take other functions, e.g., the second power or the fourth power of the difference between data series, or the third power or the ½ power of the absolute value of the difference between the data series.

Figure 6A:
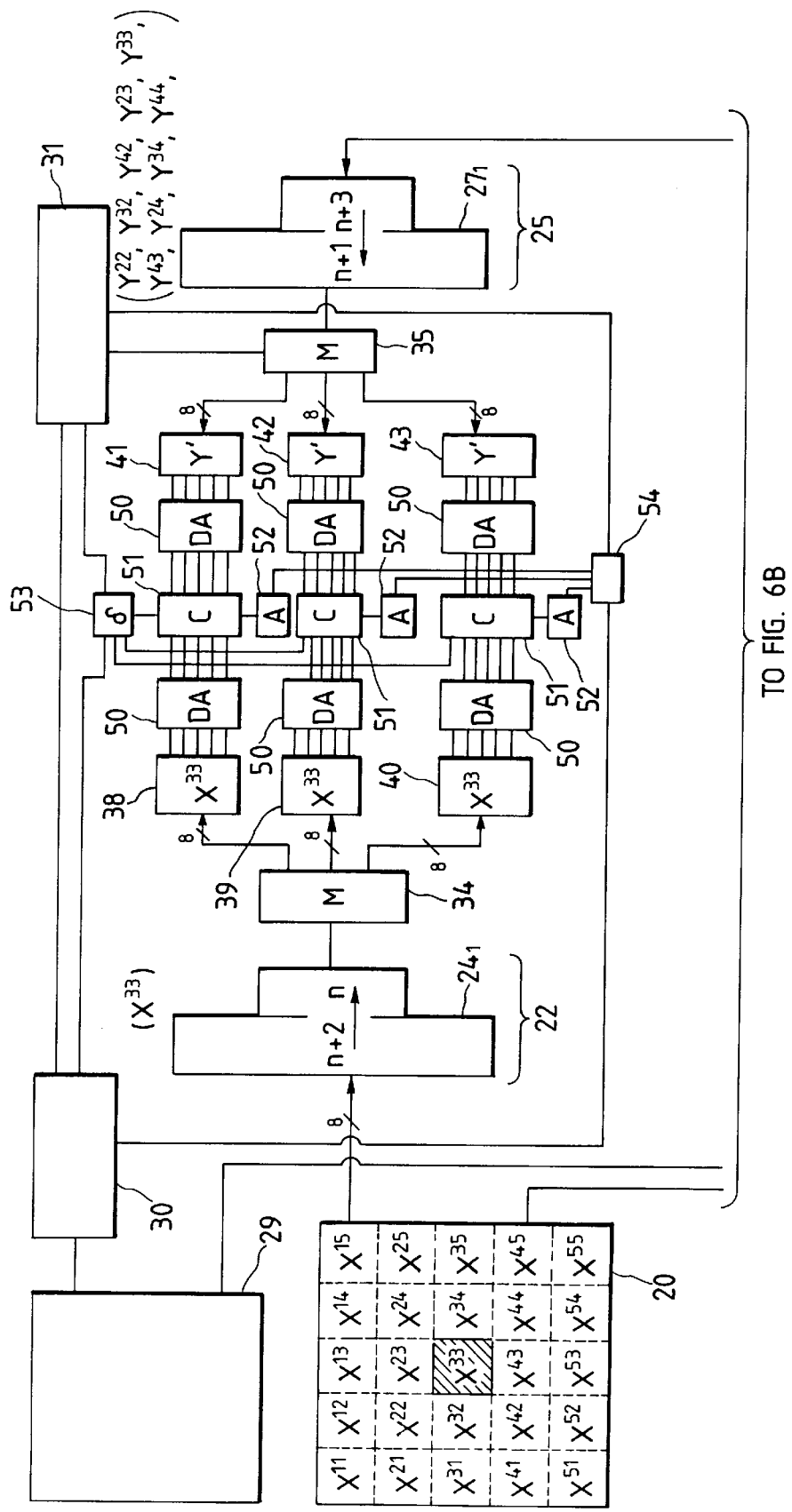
FIG. 6 is comprised of FIGS. 6A and 6B showing diagrams of an LSI circuit carrying out the data processing of the present invention.

Next, an LSI circuit structure for carrying out the algorithm discussed above will be described with reference to FIGS. 6A and 6B. In FIGS. 6A and 6B, the LSI circuit includes a frame memory 20 which stores image data (e.g., the image data converted into a luminance signal, etc.) at time t1 and another frame memory 21 which stores image data at time t2. The data stored in the frame memories, as shown in an example of Xij (i=1 to 5, j=1 to 5), are respectively divided into a plurality of areas and the movement quantity thereof is detected in each divided area, so that, for example, the data on the areas X33 and X34 are read out into buffer memories 22 and 23, respectively. In FIGS. 6A and 6B, only the above two buffer memories 22 and 23 were shown, but the number of buffer memories can be changed depending upon the design. Then, at time t1, the data in the frame memory 20 is designated as a standard to investigate where the standard data was shifted at time t2. The data n existing at time t1 corresponds to only the data on the areas X33 and X34, so that the image data to be investigated have only to be selected from the above areas. However, at time t3, the data stored at time t2 is designated as a standard, so that the data n+2 becomes larger since the data spread over a wide investigation area, as shown at $24_1$, and $24_2$ of FIGS. 6A and 6B.

On the other hand, although the data in the frame memory 21 are read out into buffer memories 25 and 26 as well, since the data to be read out includes the data on the investigation areas existing at time t1 as mentioned above, the data overlapping each other across the wide area are read out as shown at $27_1$ and $27_2$.

Next, before start of the multistep type correlational arithmetic operation, signals that designate thinning out quantity for investigation and the determination conditions are sent from a control unit 29 to respective correlational arithmetic operation unit controllers 30, 31, 32 and 33.

The respective controllers are provided for setting of different determination conditions in consideration of various cases, e.g., such that an image has less contrast on a certain area but high contrast on another area. Then, desired data are distributed in second buffer memories 38 to 49 by multiplexers 34, 35, 36 and 37 according to the thinning out quantities in response to the signals from the respective correlational arithmetic operation unit controllers. As shown in FIG. 3, the image data on the area X33 are transferred into the second buffer memories 38, 39 and 40, while the image data on the area X34 are transferred into the second buffer memories 44, 45 and 46. On the other hand, data series to be compared with the data on the area X33 are transferred out of data existing on areas Y22, Y32, Y42, Y23, Y33, Y43, Y24, Y34, Y44, according to the above thinning out quantities, to the second buffer memories 41, 42 and 43. Similarly, data series corresponding to the data on the area X34 are transferred, according to the thinning out quantities, to the second buffer memories 47, 48 and 49. After being transferred to the respective buffer memories, those data are converted into analog data through D/A conversion circuits 50, respectively. After being converted into the analog data, the arithmetic operation for comparison is performed with respect to each data of the data series in each $|X-Y|<\delta$ determination circuit 51 and the results of the operation are summed up in each adder 52. In addition, the determination parameter δ for the determination circuits 51 is applied from respective power source circuits 53. Then, the results of the addition in the above adder 52 are respectively input to parallel-input type maximum-value detection circuits 54, and then, addresses of data series on the area Y' that obtained the respective maximum values are sent to the respective correlational arithmetic operation unit controllers. The concrete structure and operation of the above correlational arithmetic operation circuit according to the present invention will be described in detail later.

Next, addresses near by the addresses of the data series that obtained the respective maximum values, i.e., investigation areas for the next correlational arithmetic operation are determined by the correlational arithmetic operation unit controllers 30 to 33. The determination circuits have a programmable circuit structure in which the determination can be performed according to applications by changing its methods, such as to start the determination from the data series obtained upper correlation data in the above maximum value detection circuit and to determine address positions in the vicinity of the data obtained the maximum values in accordance with a desired rule. However, after the system to be used was determined, the circuit structure may be fixed. Then, the correlational arithmetic operation on the next limitation areas have only to repeatedly operate the circuit shown in FIGS. 6A and 6B, so that the description of the next arithmetic operation is omitted.

Figure 7:
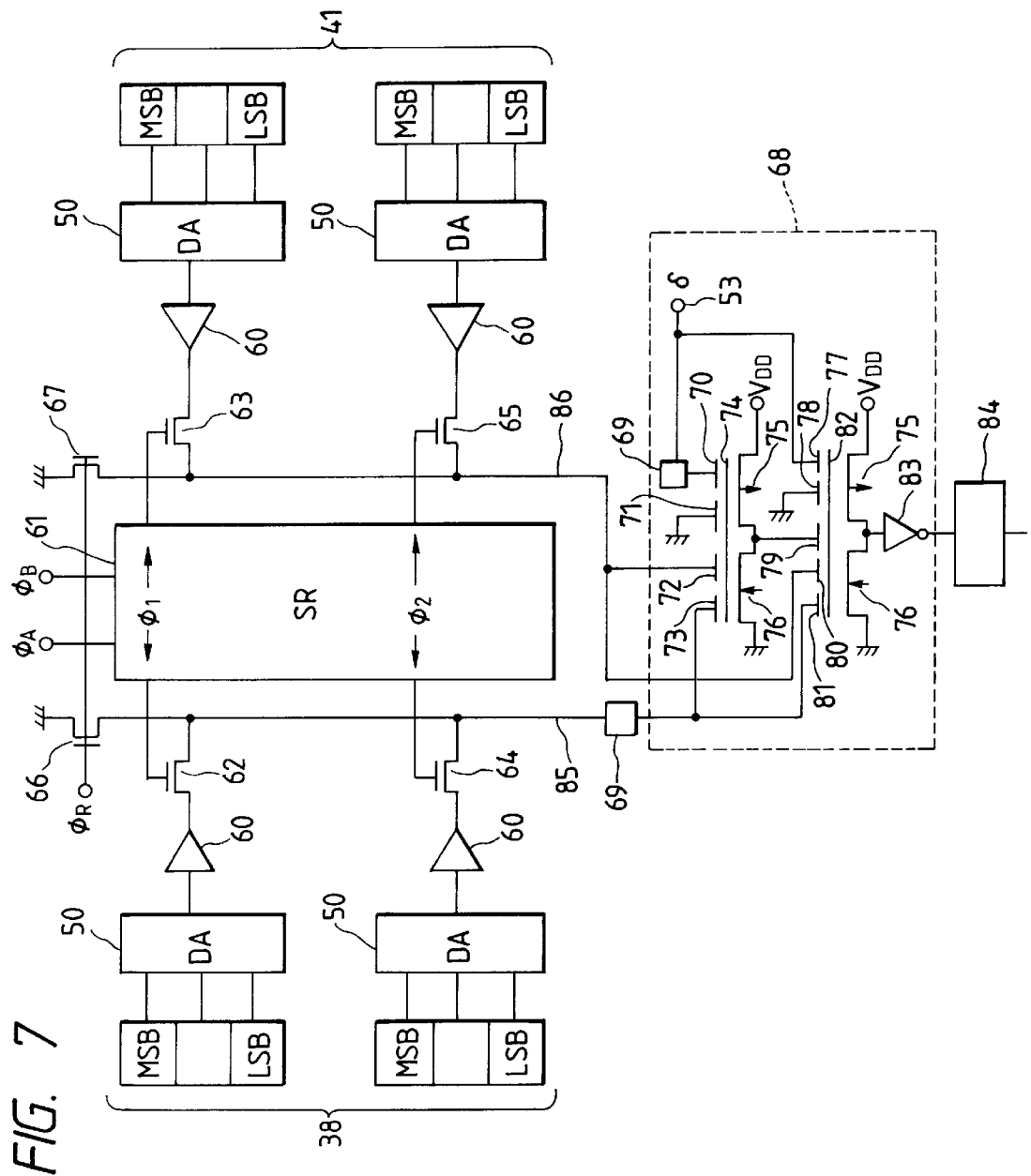
FIG. 7 is a diagram of a circuit performing a correlational arithmetic operation and adding processing in the LSI circuit of FIGS. 6A and 6B.

Next, a concrete circuit of the correlational arithmetic operation will be described with reference to FIG. 7. In FIG. 7, the same elements as those shown in FIGS. 6A and 6B use the same reference numerals to omit their descriptions. Referring to FIG. 7, amplifiers 60 is for amplifying analog signals from the D/A converters 50 and a shift register 61 is for generating pulses $\phi_1$ and $\phi_2$ in order in response to pulses $\phi_A$ and $\phi_B$. Before activation of the shift register 61, data output lines 85 and 86 are reset by a pulse $\phi_R$ to a predetermined electric potential to be turned in a floating state, and then, the analog signals are input to the output lines by the pulse $\phi_1$, one analog signal corresponding to the digital signal stored in the buffer memory 38 is output to the output line 85 and the other analog signal corresponding to the digital signal stored in the buffer memory 41 is output to the output line 86. These signals are input to the some gates out of multi-input gates formed through a floating gate 74, i.e., the signal on the output line 86 is input to gates 72 and 80, while the signal on the output line 85 is input to gates 73 and 81 via an analog inverting amplifier 69.

On the other hand, gates 71 and 78 are ground, a gate 70 is connected to the power source 53 applying the determination parameter 8 via the inverting amplifier 69 and a gate 77 is directly connected to the power source 53 for parameter 6. Reference numeral 75 indicates a p-type MOS transistor and 76 indicates an n-type MOS transistor.

Figure 8:
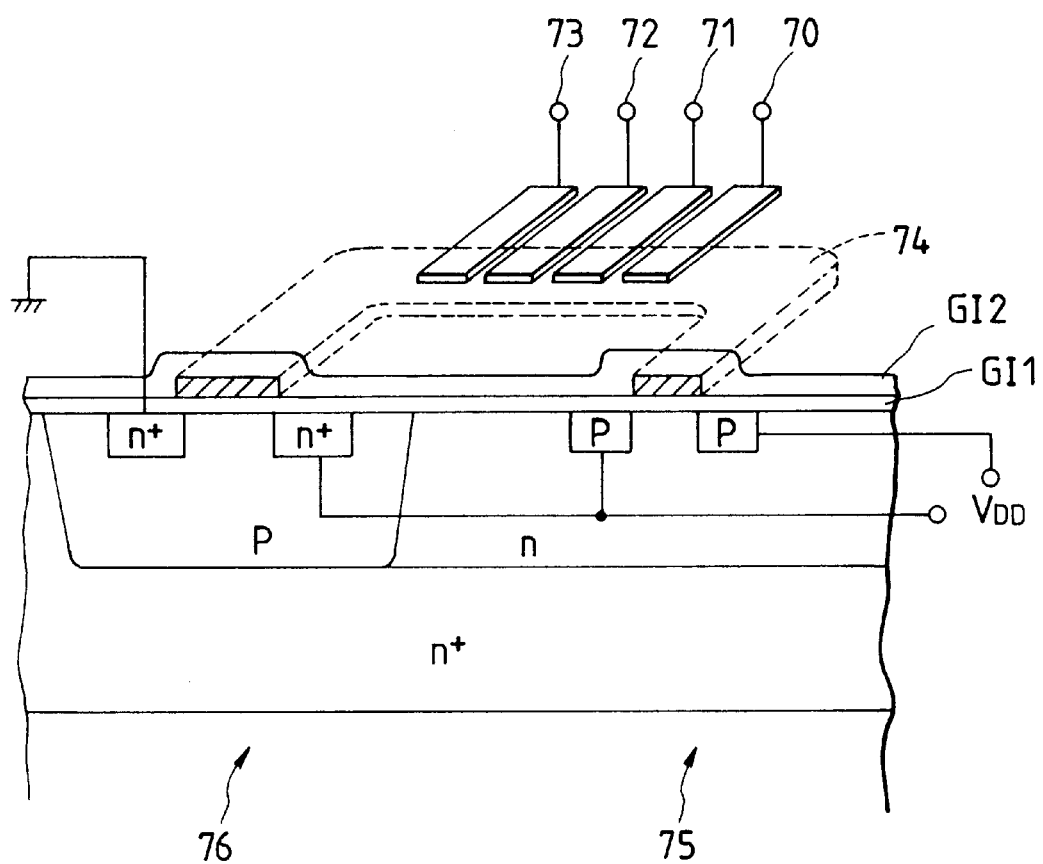
FIG. 8 is a schematic diagram of a semiconductor device constituting part of the circuit for performing the correlational arithmetic operation.

In addition, FIG. 8 is a schematic diagram showing a structure of a semiconductor device of a circuit 68 shown in FIG. 7, including the gates 70 to 73 and the floating gate 74. As shown in FIG. 8, an n-type region and a p-type region are provided on a n+ region formed on a substrate. In these regions, n+ regions used as a source and a drain of a n-channel MOS transistor and p regions used as a source and a drain of a p-channel MOS transistor are provided. On the surface of such a semiconductor, a gate insulating film GI1 is formed. The gate insulating film GI1 is provided with the common floating gate 74 thereon and the floating gate 74 is provided with four gates 70 to 73 through a second insulating film GI2. Such a basic structure of the semiconductor device is discussed in "TRANSACTIONS ON ELECTRON DEVICES" IEEE, Vol. 39, No. 6, pp. 1444–1455, June 1992.

The circuit 68 constituted with such a structure mentioned above outputs, through an inverter 83, a voltage of $V_{DD}$ level when the absolute value between the output lines 85 and 86 was less than the voltage δ and a voltage as a ground potential in the other cases. Accordingly, the determination conditions can be changed by the voltage δ according to the circuit 68. After completion of the correlational arithmetic operation of the data that are output from the buffers 38 and 41 by the pulse $\phi_1$, the output lines 85 and 86 are reset again by the pulse $\phi_R$ to perform the correlational arithmetic operation of the data stored in the buffers 39 and 42. Thus, the results of the correlational arithmetic operation are obtained according to time series, so that an adding circuit 84 performs additions in due order.

Figure 9:
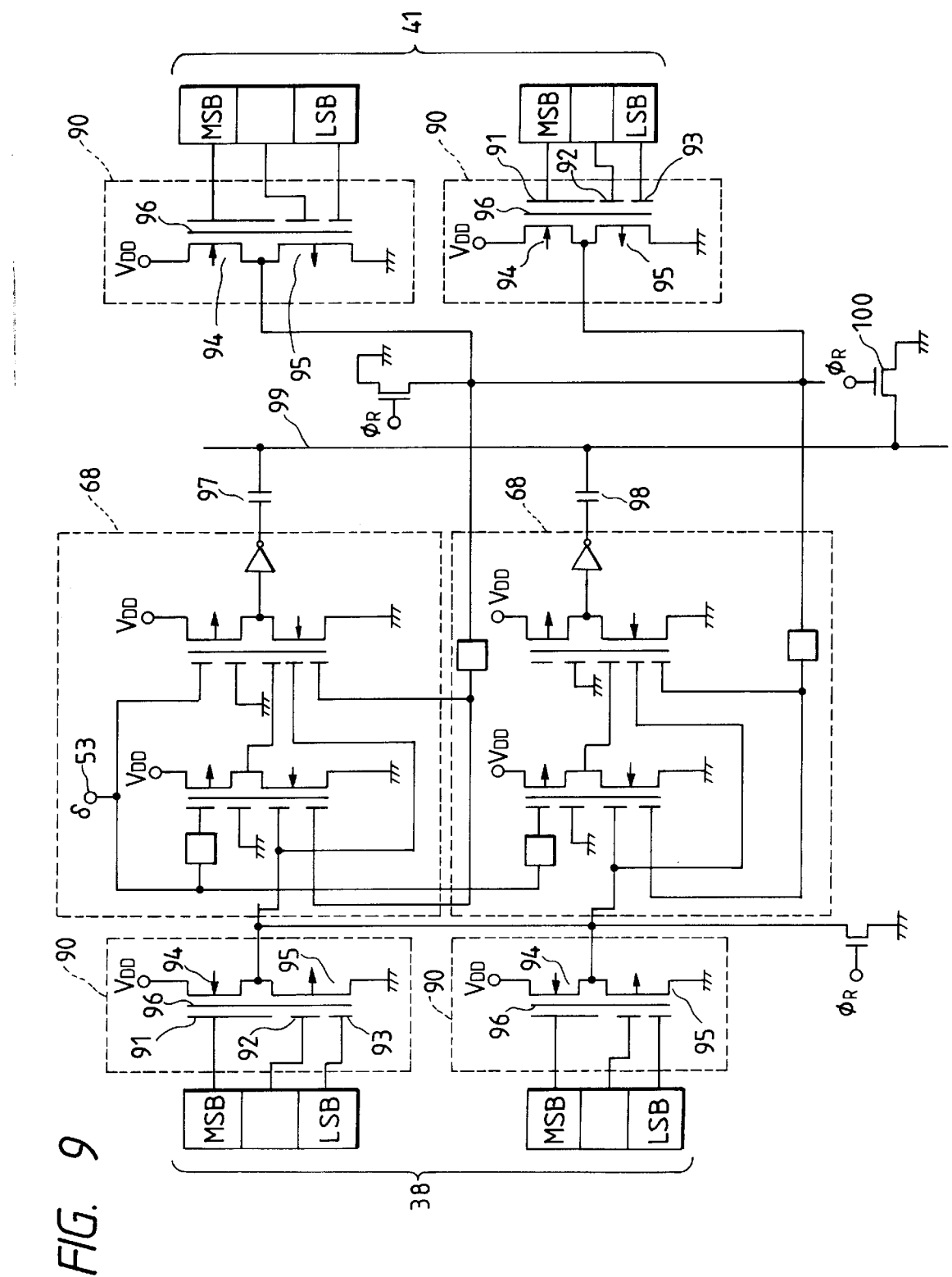
FIG. 9 is a diagram of another circuit for performing a correlational arithmetic operation and adding processing.

Next, another structural example of a circuit for arithmetic operation of absolute value and adding operation will be described with reference to FIG. 9. In FIG. 9 as well as FIG. 7, the identical elements use the identical reference numerals to omit their descriptions.

The structure differs from the foregoing example primarily in that a new structure is used in D/A converters and secondarily in that parallel arithmetic operation is used instead of the sequential arithmetic operation. In FIG. 9, D/A converters 90 utilizing floating gates is for 3 bits. Input gates 91, 92 and 93 of which areas show a ratio 4:2:1 are coupled in capacitance to the corresponding floating gate 96. Therefore, an upper bit is input to each gate 91, a middle bit is input to each gate 92 and a lower bit is input to each gate 93, that is, the potential on the floating gate is determined in accordance with the gate area ratio. Thus, each analog signal corresponding to the digital signal is output by a CMOS source floor amplifier constituted of an n-type MOS 94 and a p-type MOS 95. These analog signals are respectively input to the |X−Y|<δ circuits 68 discussed in FIG. 7 and then the output lines from the circuits 68 are connected with a floating bus output line 99 through capacitors 97 and 98. The output line 99 is ground by a reset MOS 100 before activation of the circuits 68. Then, the circuits 68 are activated after the transistor 100 was turned OFF, i.e., in the floating state. As a result, the respective outputs automatically added through the capacitors 97 and 98.

Next, a structure of a maximum detection circuit will be described. To give an example of the structure, the circuit is provided with a comparator, a register and a counter therein to compare input data with a maximum value out of all the data input up to that time, so that, if the data newly input thereto is larger than the maximum value, the data is input into the register. If the confirmation of the data used as the maximum value is required, it can be carried out only by counting addresses of all the input data in the counter and inputting these address information into the register. Also, if the detection of only upper several bits is required, it can be achieved only by turning the structure into a multistage structure.

Figure 10:
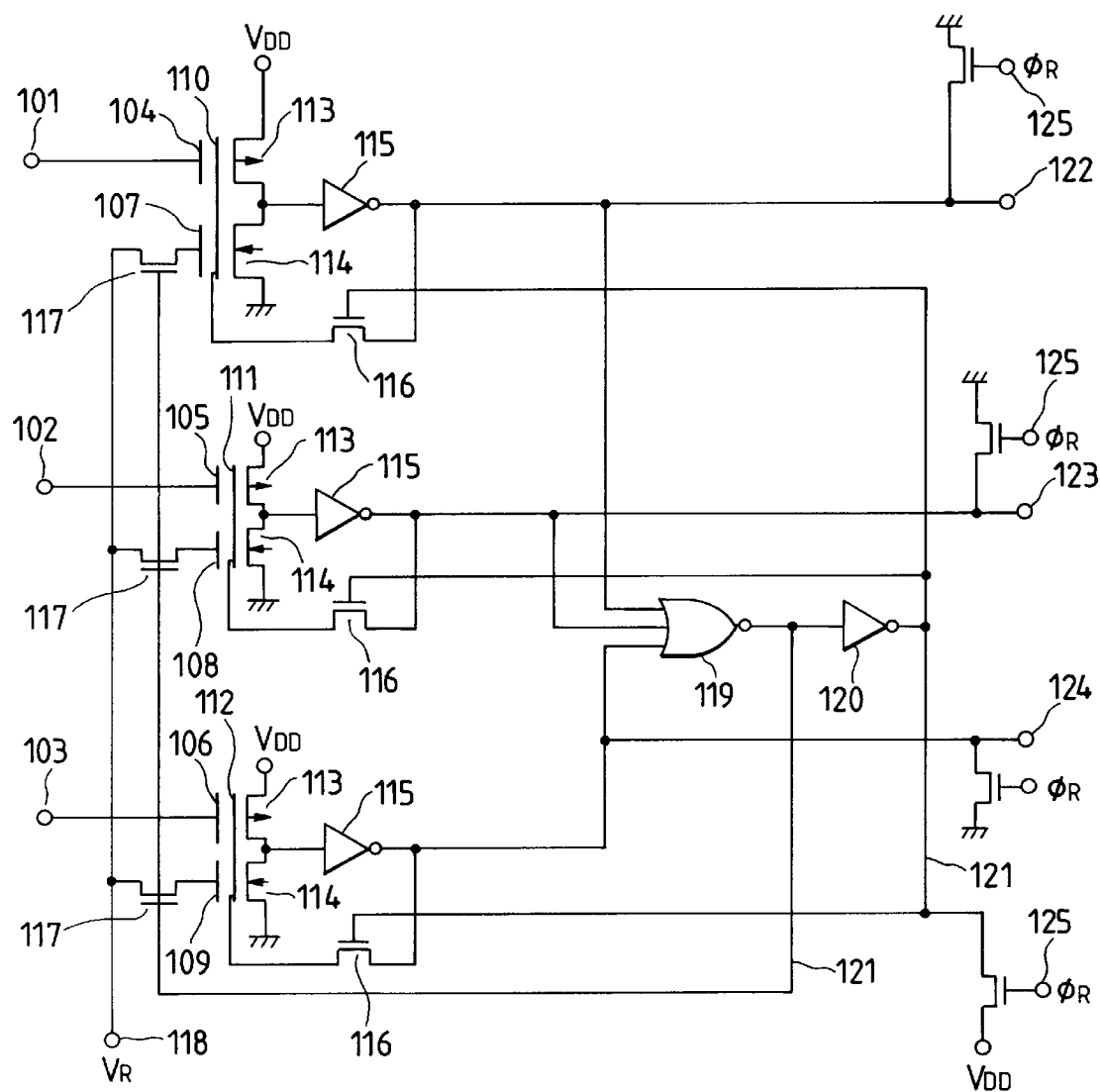
FIG. 10 is a diagram of a circuit for performing a maximum value detection.

FIG. 10 shows a structure for performing the maximum value detection in the circuit using the floating gate shown in FIGS. 7 and 9. In FIG. 10, reference numerals 101, 102 and 103 are terminals for inputting the resulting outputs of the correlational arithmetic operations (i.e., outputs adding the determination results of the maximum values for the respective pixels). The output resulting from the operations between the data on the area X33 and the data stored in the buffer memory 41 is input to the terminal 101, the output resulting from operations between the data on the area X33 and the data stored in the buffer memory 42 is input to the terminal 102 and the output resulting from operations between the data on the area X33 and the data stored in the buffer memory 43 is input to the terminal 103. That is, the terminals are respectively connected with the corresponding floating bus output line 99 shown in FIG. 9. Then, these terminals are connected respectively to input gates 104, 105 and 106. The other input gates 107, 108 and 109 are connected with a clamping voltage power source 118 via MOS switches 117. The above input gates are provided for CMOS inverters through corresponding floating gates 110, 111 and 112. Each of the CMOS inverters is constituted of a p-type MOS transistor 113 and an n-type MOS transistor 114. The outputs from the gates are respectively connected, through the inverters 115 used in general, to output terminals 122, 123 and 124, and commonly connected with a NOR 119. An output 121 of the NOR 119 is connected to gates of the MOS switches 117 and also to gates of MOS switches 116 through an inverter 120. The outputs of the output terminals 122, 123, 124 and the inverter 120 are connected respectively with the ground potential and the $V_{DD}$ potential through reset MOS switches 125.

Next, the maximum value detection circuit will be described. The pulse $\phi_R$ prior to activation of the circuit is first turned into a high state to supply each output line with the voltage as the ground potential. On the other hand, the MOS switches 116 are turned ON to reset the floating gates 110, 111 and 112 to the ground potential, and then, the pulse $\phi_R$ is turned to a low level to set the output terminals and the floating gates in the floating state. The output terminals are connected with GND, so that the output of the NOR 119 is set in the high state and the gates of the switches 117 are set in an ON state. On the other hand, the output of the inverter 120 is set in the low state, so that the MOS switches 116 are set in an OFF state. Then, a lamp power source $V_R$ shown by reference numeral 118 changes from the low level to the high level, therefore, the results of the correlational arithmetic operation are input to the terminals 101, 102 and 103 from the state of being reset.

As a result, the inverters 115 are changed from the high state to the low state in order from the inverter exhibiting the highest voltage in the resulting value, i.e., the outputs of the inverters 115 change into the high ($V_{DD}$) state. After that, the output of the NOR 119 is low and the output of the inverter 120 is high, so that the gates of the MOS switches 116 are turned in the ON state.

For this reason, only the output from the inverter that the maximum value was input sets the floating gate high, while the outputs from the other inverters set the floating gates low. On the other hand, the gate that the clamping voltage was input outputs low to the NOR, so that the corresponding MOS switch 117 is turned in the OFF state and the clamping voltage is not applied thereto.

From the operation principle discussed above, only the terminal that the maximum value was input can output the high level and the other terminals output the low level.

The above structure was provided with the MOS switches 117, but those switches are not always required. In the structure, a delay circuit, etc. can be inserted in consideration of the delay of pulses in each operation. Also, utilizing the pulse to input the maximum value and to output the high level, the corresponding unit can be separated from this structure to be extended into a circuit capable of the next maximum value detection.

As described above, the present invention uses the above new circuit structure which includes a plurality of input gates and MOS transistors each having a floating gate coupled in capacitance to the corresponding input gate, so that a new algorithm operation can be realized with a simpler structure.

(Second embodiment)

Next, a second embodiment of the present invention will be described. The first embodiment discussed above was applied to the data processing for the data prestored in the memory from an image input device. In this embodiment, the present invention is applied to processing used in an automatic control system for automatic tracking robot of camera or the like, i.e., processing for transferring data to be stored from a real-time image input device to the memory.

First of all, the background of the necessity to apply the present invention to the above case will be described. Generally, image input devices processes input images after prestoring them in a frame memory, as mentioned above. However, each image data has information of 8 to 10 bits in a gradation level, so that, even in case of 640×480 pixels, the processing is required to write and read out the data into the frame memory capacity and the memory at a high speed. If the data has the information of 1 or 2 bits and a highly accurate movement detection processing can be performed, this results in important information compression.

In order to achieve the above compression, there is provided a method, according to the present invention, in which a picture image signal and another signal for edge detection are output from a sensor, the former signal is written into a general frame memory and the latter is stored in a memory of small capacity through the absolute value determination circuit mentioned above. With respect to the data after storage, the movement vector is detected according to the processing system discussed in the first embodiment and only the image data that appeared in the preceding frame are read out from the frame storing the picture image signals to compress the image data. For this reason, another memory for movement detection is required except the memory storing the picture image information, but the movement detection processing is simplified and the read-out speed is also reduced, so that this method can use low cost memories to reduce the total cost.

Figure 11:
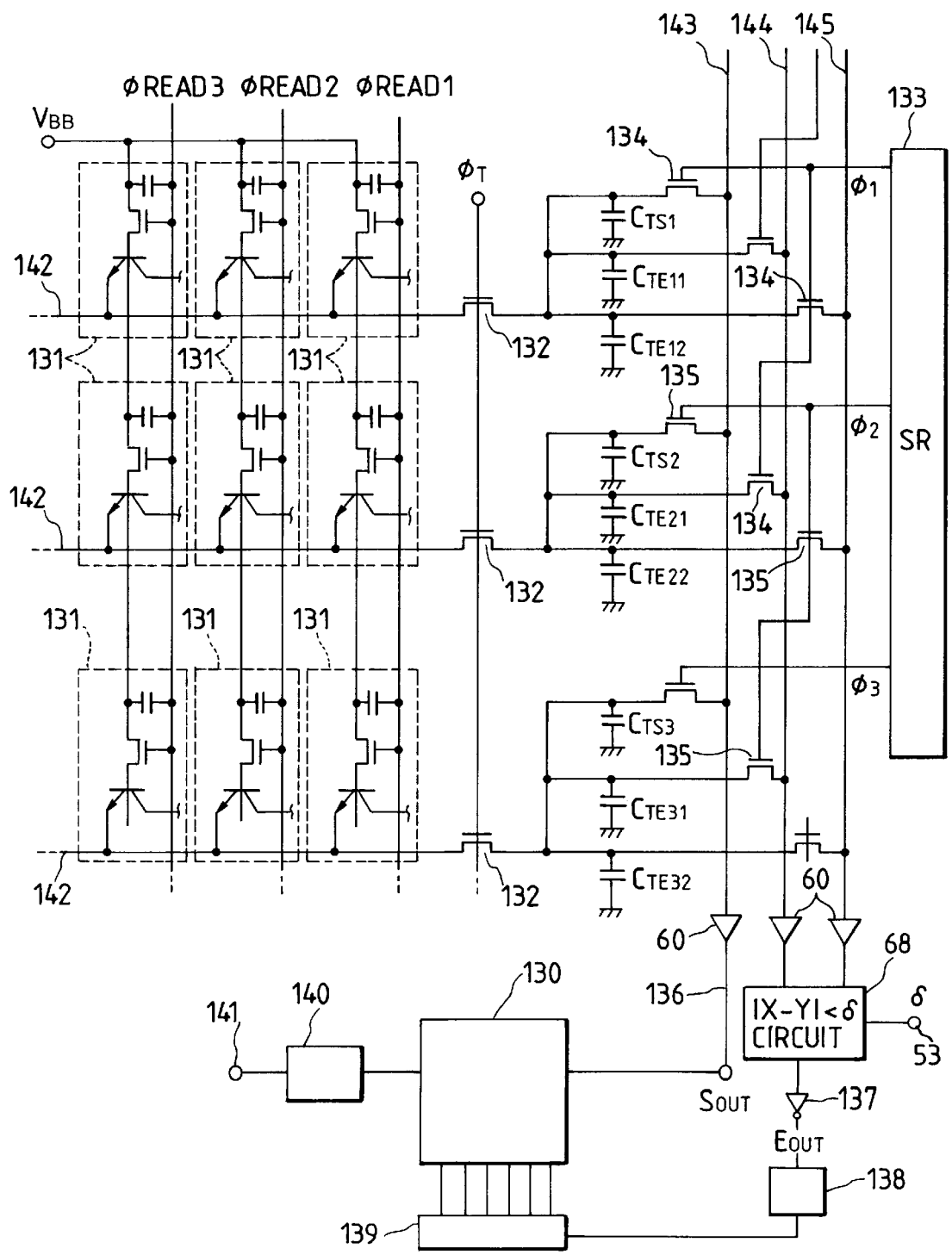
FIG. 11 is a diagram of a signal processing circuit in a photoelectric converting apparatus according to a second embodiment of the present invention.

Referring to FIG. 11, a concrete circuit structure according to this embodiment of the present invention will be described. In FIG. 11, the circuit includes a memory 130 for storage of picture image signals and sensor cells 131 (BASISs) for storing optical signal charges in bases of bipolar transistors to read out a voltage into a load capacitor according to the stored optical signal charges.

After storage of the optical signal charge in each base area of photoelectric converting portions, each read-out line 142 is reset to turn pulses $\phi_T$ and $\phi_{read1}$ to a high level, so that a signal is read out from a cell, being connected with an activation line to which the pulse $\phi_{READ1}$ is applied, to capacitor loads $C_{TSi}$ and $C_{TEij}$ (i=1 to n, j=1, 2). Then, when a pulse $\phi_1$ is generated primarily from a shift register 131, each MOS switch 134 turns ON to read out signals, i.e., a signal transferred to the $C_{TSi}$ is read out on an output line 143, a signal of $C_{TE21}$ is read out on an output line 144 and a signal of $C_{TE12}$ is read out on an output line 145. Picture image signals are output to the output line 143 in due order by pulse scan of the shift register, while signals from pixels adjacent to the picture image signals are output to the output lines 144 and 145. After amplifying these outputs through amplifiers, the picture image signals are input to the memory 130. On the other hand, the outputs of the output lines 144 and 145 are input to the absolute value determination circuit 68 to output "1" to a terminal $E_{OUT}$ 137 when a difference in data, i.e., an edge signal is larger than a predetermined value, or to output "0" when it is smaller than the value.

The edge data can be written in the memory after A/D conversion not through the above absolute value determination circuit. However, by utilizing the absolute value determination circuit as discussed in this embodiment, the data becomes 1-bit digital information, so that the compression rate can be improved. As an aside, the output is not necessarily 1-bit data and multivalued outputs can be output.

After that, the movement detection is performed based on the information output from the memory 138 and the results of the detection are transferred to the memory 130 as address information from 139. In this embodiment, although the bipolar transistor provided with the capacitor as the load was used in the sensor portion, the adjacent outputs can be transferred as well by using a CCD image sensor and providing buffer memories at output terminals. Another circuit structure provided with a MOS type image sensor can be also utilized. Furthermore, in the above circuit structure, it is possible and preferable to perform other arithmetic operations according to Laplacian method, etc. as well as the above simple processing for the adjacent outputs.

Also, although the circuit according to the present invention is provided with the shift register to process serial data inputs, it is needless to say that the above absolute value determination circuit is provided on each line to be output in parallel so that the processing can be performed at a high speed. For the purpose of the description of the circuit, the image output and the memory for image output are also shown in the drawing, but it is possible to omit them when only the movement information is required in automatic tracking or automatic control of robot.

In addition, in this embodiment, the information compressed in comparison with the original image information input from the image input devices, such as the edge data, is directly detected to perform its movement detection processing, it is also possible to perform the above compression processing at the time when the data is read out from the frame memory that stored the image data to the movement detection circuit. For the above compression processing, it is preferable to use only a color signal, or a signal only in a band region on which luminance signals appears, etc. As to which signal is preferable, it depends upon the purpose for uses. For example, when detecting the movement of a tennis ball, if the ball is yellow, only the yellow signal can be processed. Or, if the color signal is not enough to specify the movement, the detection can be performed preferably in combination with part of the luminance information in order to improve its arithmetic operational accuracy.

The above description was made with respective to the example of using the compressed data out of all the image data, but the present invention is not limited to the image data only and heat or audio information can be utilized. In this case, however, the information to be used should be less than image data in quantity and meet the requirement in order to prevent from increase of steps in the data processing.

(Third embodiment)

Next, a third embodiment of the present invention will be described with reference to FIG. 12. While the above embodiment discussed the movement detection by use of the correlational arithmetic operation between the images at different time, the third embodiment of the present invention calculates distance information by detecting a difference quantity in space.

Figure 12:
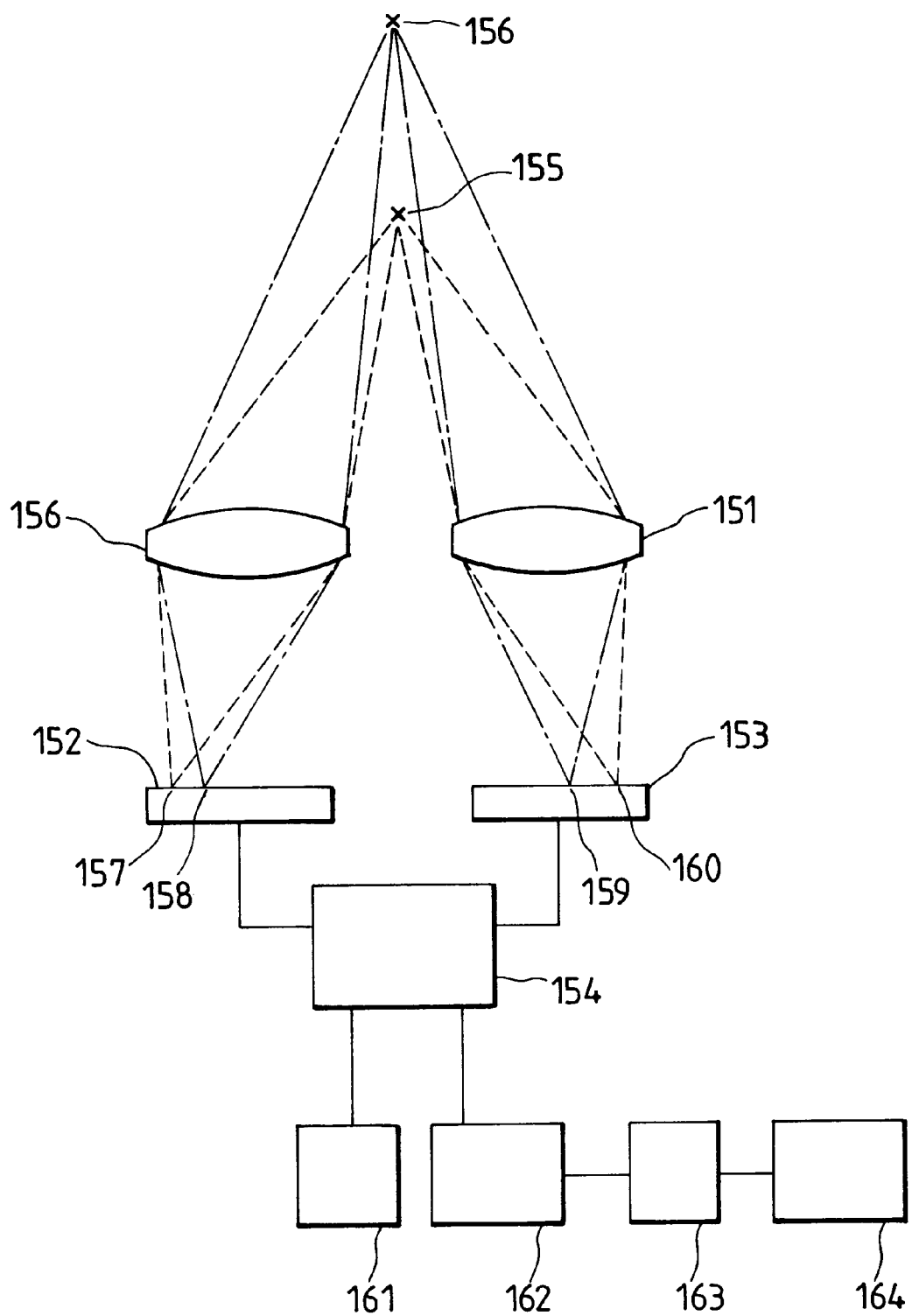
FIG. 12 is a diagram of an apparatus for calculating distance information according to a third embodiment of the present invention.

In FIG. 12, there include lenses 150, 151 and image input devices 152, 153. The outputs from the image input devices 152 and 153 are first input to a correlational arithmetic operation unit 154. For the correlational arithmetic operation unit 154, the same circuit unit as adopted in the movement detection can be used, so that the description is omitted. Referring to FIG. 12, when a position 155 of an object point is relatively near, a position 157 of an image formation of the left lens 150 goes to the left side, while a position 160 of the image formation of the right lens 151 goes to the right side. On the other hand, if the object point goes away from the position 155 to a position 156, the positions of the image formation move from 157 to 158 and from 160 to 159, respectively. As a result, a spatial difference between image data from the image input devices 152 and 153 is calculated so that the distance information can be obtained.

Also, if changes with time is detected in the image input devices 152 and 153, respectively, the movement information 161 and the distance information 162 can be obtained at real time. This can be achieved by the high-speed and highly accurate arithmetic operation according to the present invention.

Utilizing the above embodiment, an user's eyes detection system can be developed to be applied to a TV conference system, an interactive TV, a word processor and the like. In the system, user's image data (obtained from a camera taking the user's picture) at the time when the user looked at lights lighting at four corner of a display are taken in respectively as reference data to generate the distance image data in the unit 162. Then, the distance information is written in a RAM so that the user's image characteristics, such as eyes, nose, mouth and the like, and the user's facial expressions different in location to which user's eyes are directed are stored. This is because human's characteristics can be expressed by the above distance informations. After that, a movement search area is set on the user's face to trace the facial movement.

The movement search area can be obtained from the movement information stored in the unit 161. As a result, only the area on the face is separated out of the image data and the distance information from the separated area is compared with various patterns stored in a unit 164 by the correlational arithmetic operation unit 163 according to the present invention to select the closest pattern, so that the identification (identity recognition) is made, as to which part of the display the user looks at, or which user it is. Accordingly, eyes cursor can be realized in the word processor. Also in the TV conference system, the camera being taking the user's picture can track the user's movement according to the user's identification or the user's eyes. Or, in the interactive TV, the function for changing channels to an user's desired screen can be performed spontaneously.

Next, a structure of the identification system and a method to apply the system will be described in brief. As mentioned above, infrared LEDs are provided at desired positions of a terminal equipment having a display, such as a personal computer or a word processor, so as to turn the light on. An image of a person who was permitted to use this system is taken in with a reflective light by a solid state image pick-up device sensitive to the infrared LED light at the time when the person faced to the display screen. To achieve this, the structure has only to be provided with bound path filters respectively in front of sensors, such as high infrared CCD image sensors or bipolar type image sensors.

The image taken in by the above method is changed into the above distance information and then stored in the RAM. On the other hand, if the infrared LED is turned on and off to store the signals in the above solid state image pick-up device in synchronous with the above on-and-off light, only the signals in response to the on-and-off light can be detected. Then, the detected signals are also changed into the distance information to perform the correlational arithmetic operation, so that further intelligent functions, such as that only a specific user can turn ON the personal computer or the word processor and that a different information message according to persons is displayed on the screen, can be carried out. Or, if the person can not be specified in detail, this can be utilized at least for determining as to whether or not someone is on the display from the human's characteristic information, such as eyes, nose, mouth or ears.

Also, in the word processor using the eyes detection method, the screen can be automatically scrolled in the case the eyes came to the end of the screen.

As described above, according to the respective embodiments of the present invention, the correlational arithmetic operation of the image signals or the like can be performed accurately at a further high speed without the increase in clock of the processing circuit. And, in the movement detection currently required, for example, the movement quantity of the F1 racing machine can be detected. Also, this can be carried out by a low-cost and simple structural chip even in the high definition image processing.

It is also possible to handle the correlational arithmetic operation data independently from the picture image signals, thereby performing the image compression in the step prior to the image processing. Also, the pattern recognition can be realized based on the distance information of the image as well as the movement information, and further, the identification of the user or the eyes detection can be carried out by use with the display. Accordingly, the present invention can effectively applied to various uses directed to multimedia.

(Fourth embodiment)

Figure 13:
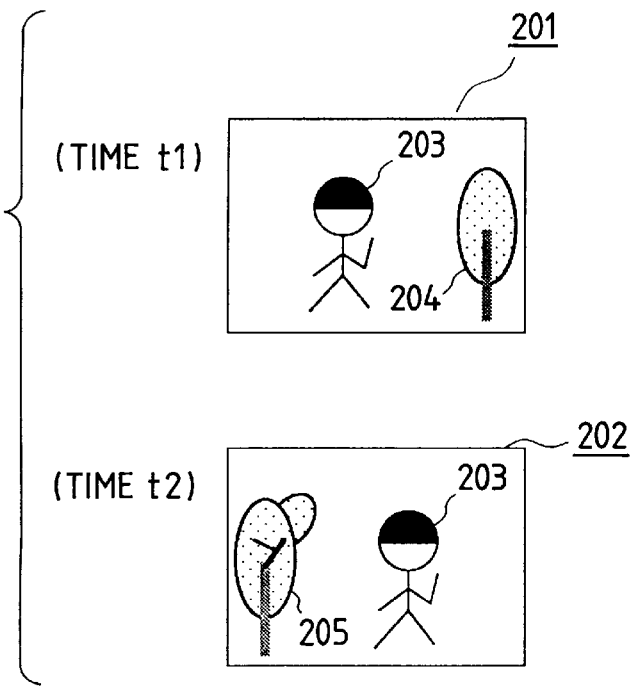
FIG. 13 is an illustration of images different in time, being used in the first embodiment of the present invention.
Figure 14:
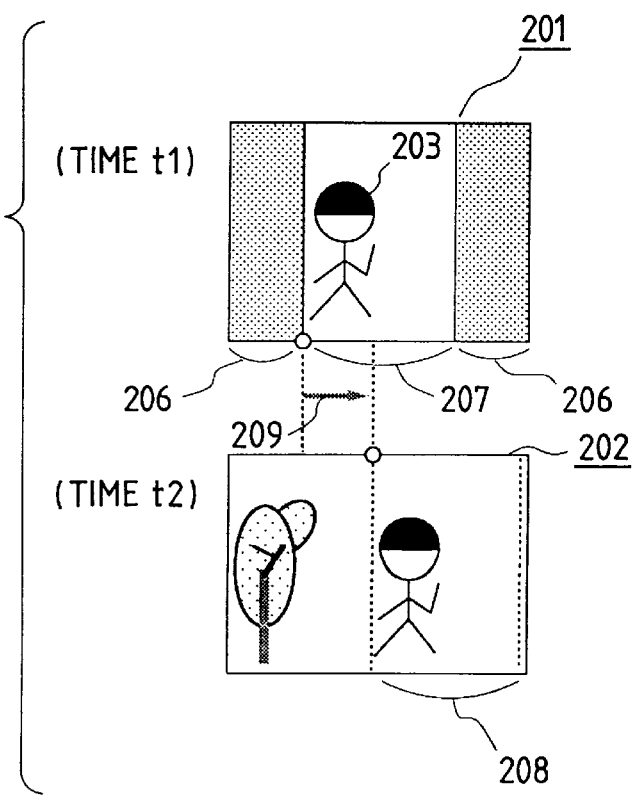
FIG. 14 is an illustration of images explaining the principle of movement vector detection according to a fourth embodiment of the present invention.

FIGS. 13 and 14 shows another data processing method according to a fourth embodiment of the present invention. In FIG. 13, there are shown an image 201 at time t1 and an image 202 at time t2 (t1<t2).

There is a person 203 and a tree 204 on the right hand of the person 203 in the image 201. In the image 202, the person 203 is shifting on the left hand in comparison with the image 201 as a result of shifting during time t1 to time t2. This is equivalent to the state that the camera was panned on the right hand. Accordingly, the image data corresponding to the tree 204 of the image 201 is canceled to take in the image data corresponding to the tree 205 of the image 202 as new image data. In other words, the state of the image 202 corresponds to the state that the tree 204 of the image 201 got out of the angle of view, the tree 205 got into the angle of view and the person 203 shifted on the right hand.

Then, referring to FIG. 14, the principle of the movement detection according to the present invention will be described.

In FIG. 14, there are provided masking areas on the both sides of the image 201 so that the correlational arithmetic operation for movement detection is not performed thereon. Therefore, the image data on the masking areas 206 can not be used during the correlational arithmetic operation. Then, image data in a image frame identical to a data area 207 of the image 201 are extracted from the image 202 to perform a series of correlational arithmetic operations between the data area 207 except the masking areas 206 and the image 202. In other words, the above image frame is shifted from the left hand to the right hand of the screen, therefore, a data area 208 correlative with the data area 207 most strongly in the image 202 is detected. Then, a spatial movement quantity between the data area 207 of the image 201 and the data area 208 of the image 202 is detected as a movement vector 209.

Here, the masking areas 206 are provided on the right and left hands of the image 201, so that the image data corresponding to the tree 204 of the image 201 can be eliminated in advance from reference data. Accordingly, a value of high correlation between the data area 207 of the image 201 and the data area 208 of the image 202 can be obtained, thereby improving the S/N (signal-to-noise) ratio.

The above-mentioned example is for detecting the movement vector of the horizontal direction, but the movement vector of vertical direction can be detected by the same principle as that of the horizontal direction.

Also, this movement detecting method can effectively obtain the movement of person, the movement of object, etc., as well as the movement of such that the camera was panned, by setting the masking areas properly.

(Fifth embodiment)

Figure 15:
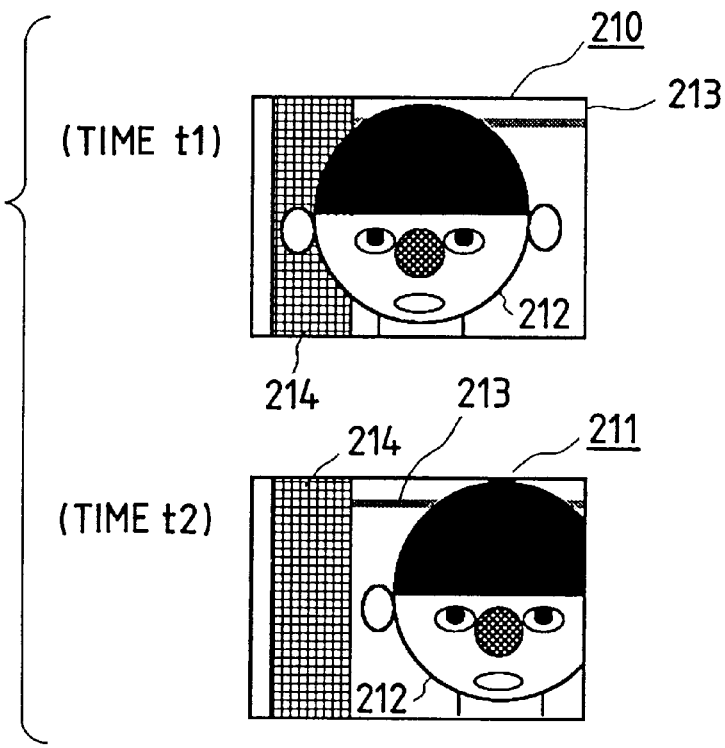
FIG. 15 is an illustration of images different in time, showing a state that a person moves in the horizontal direction.

FIG. 15 shows an image 210 at time t1 and an image 211 at time t2 (t1<t2), illustrating a state that an image of a person 212 moved in the horizontal direction. In FIG. 15, there are shown the standard image 210 at time t1 and the image 211 after shift of time t1 to time t2.

By shifting the person 212 on the right hand, the whole of a pole 214 appears, but a wire 213 comes in an out of sight. That is, there are added information and lost information macroscopically between the image 210 and 211.

Figure 16:
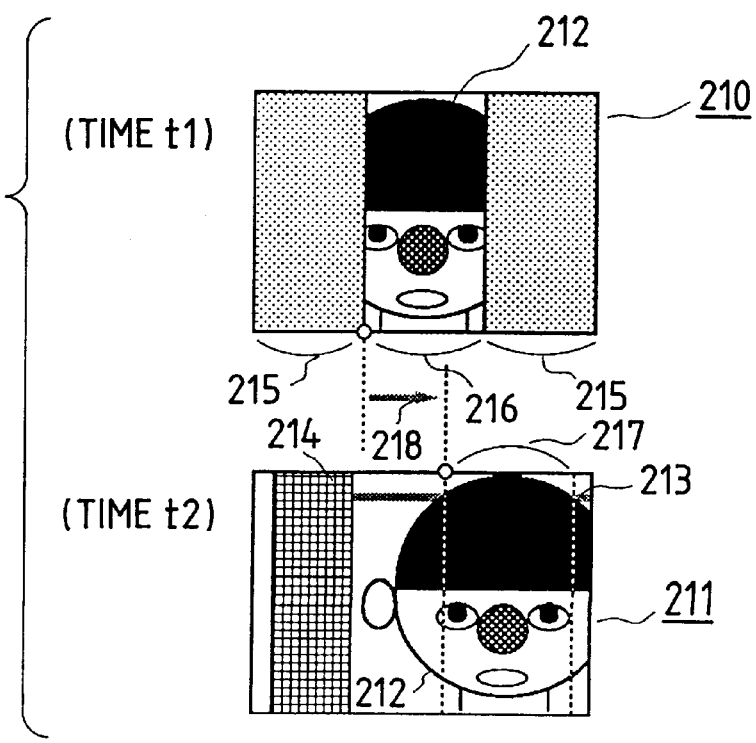
FIG. 16 is an illustration of images explaining the image processing of FIG. 13, being performed by a movement vector detecting method according to a fifth embodiment of the present invention.

FIG. 16 is a diagram illustrating the principle of the movement detection, according to the present invention, at the time when the person 212 moved in the horizontal direction.

In FIG. 16, masking areas 215 are provided on the right and left hands of the standard image 210, both being not used for the arithmetic operation, and then image data in a image frame identical to a data area 216 of the image 210 are extracted from the image 211 to perform a series of correlational arithmetic operations between the data area 216 except the masking areas 215 and the image 211.

The above image frame is shifted from the left hand to the right hand (or from the right hand to the left hand) of the screen, therefore, a data area 217 correlative with the data area 216 most strongly in the image 211 is detected. In this case, the image in the data area 216 of the image 210 is completely equal to the image in the data area 217 of the image 211 and this shows the highest correlation.

Thus, a spatial movement vector 218 can be detected between the data area 216 and the data area 217.

(Sixth embodiment)

Figure 17:
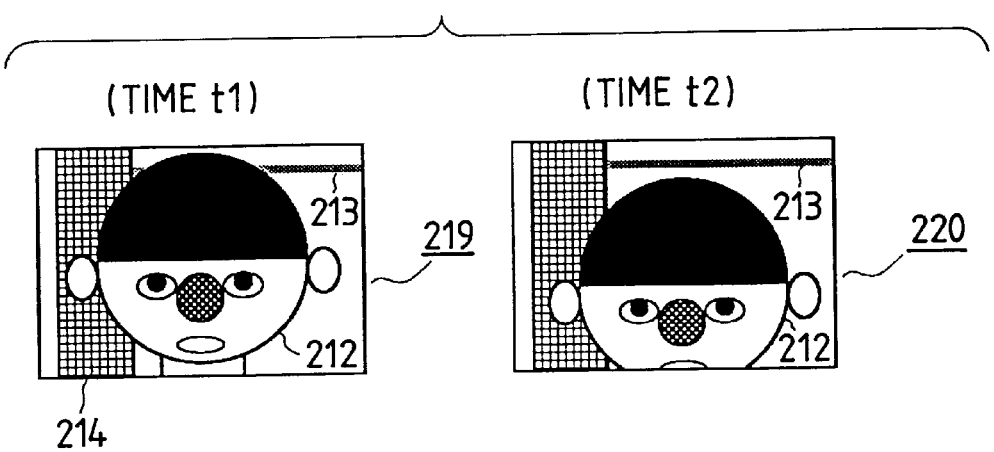
FIG. 17 is an illustration of images different in time, showing a state that a person moves in the vertical direction.

FIG. 17 shows an image 219 at time t1 and an image 220 at time t2 (t1<t2), illustrating a state that an image of a person 212 moved in the vertical direction. In FIG. 17, there are shown the standard image 219 at time t1 and the image 220 after shift of time t1 to time t2.

Figure 18:
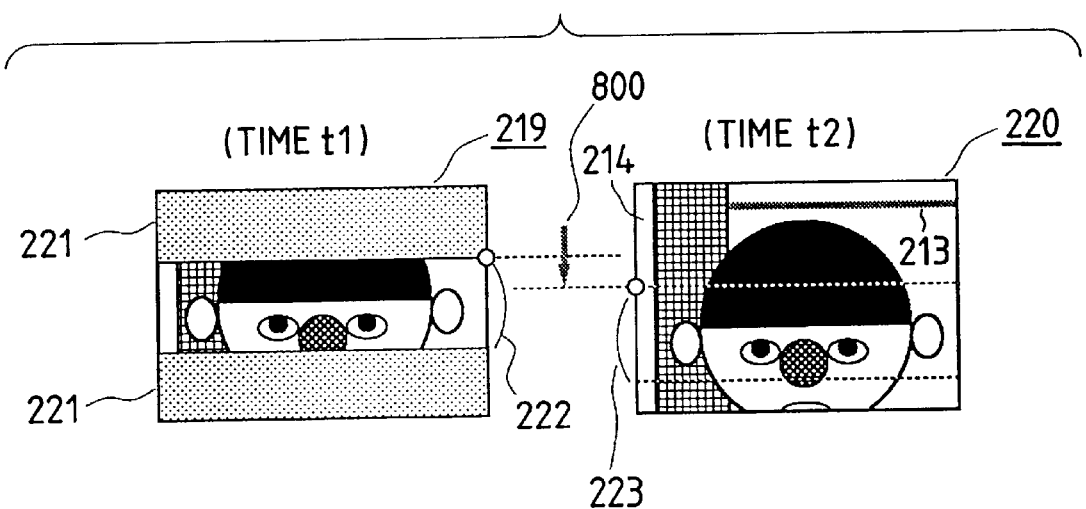
FIG. 18 is an illustration of images explaining the image processing of FIG. 17, being performed by a movement vector detecting method according to a sixth embodiment of the present invention.

FIG. 18 is a diagram illustrating the principle of the movement detection, according to the present invention, at the time when the person 212 moved in the vertical direction.

In FIG. 18, masking areas 221 are provided at the top and the bottom of the standard image 219, both being not used for the arithmetic operation, and then image data in a image frame identical to a data area 222 of the image 219 are extracted from the image 220 to perform a series of correlational arithmetic operations between the data area 222 except the masking areas 221 and the image 220.

The above image frame is shifted from the top to the bottom (or from the bottom to the top) of the screen, therefore, a data area 223 correlative with the data area 222 most strongly in the image 220 is detected. In this case, the image in the data area 222 of the image 219 is completely equal to the image in the data area 223 of the image 220, thereby detecting the highest S/N ratio. Thus, a spatial movement vector 800 can be detected between the data area 222 and the data area 223.

Although the wire 213 hidden by the head of person 212 appears as the person 212 moves from the top to the bottom, according to the present invention, image portions generated by the shift of the person 212 are eliminated from portions for the correlational arithmetic operation by the above masking areas 221, so that the area 222 of the image 219 and the area 223 of the image 220 show the best matching relation and this makes it possible to detect the high S/N ratio.

(Seventh embodiment)

A seventh embodiment shows a correlational arithmetic operation utilizing an XY projecting method in addition to the setting of masking area according to the above embodiments. FIG. 19A illustrates a still state of an image and FIG. 19B illustrates a moving state of the image. In addition, only the movement detecting method of the horizontal direction will be described herein, but the movement detection of the vertical direction can be performed in the same manner.

In FIGS. 19A and 19B, there is a moving object 800 of which movement vector is detected on an investigation area 801. The investigation area 801 includes a first masking area 802 and a second masking area 803, both being not used for the correlational arithmetic operation. Therefore, these masking areas are eliminated from a correlational arithmetic operation area and image data are extracted from the identical frame except the above masking areas at time t1 and t2 to perform the correlational arithmetic operation therebetween.

In FIG. 19A, a wave form $a_{t1}$ is a vertical (V) direction projection output at time t1, taking an accumulated sum of pixel values along the vertical direction, with the signal level showing a relation of white>gray>black. In other words, the wave form $a_{t1}$ indicates a compressed pixel value of the vertical direction and the signal values for gray and black portions become small.

On the other hand, a wave form $a_{t2}$ is a V direction projection output at time t2 (t1<t2). In this case, the observed moving object 800 is in the still state both at time t1 and t2, so that both V direction projection outputs $a_{t1}$ and $a_{t2}$ exhibit the same spatial wave form, with the absolute difference value being "0", thereby confirming that the moving object 800 is in the still state. At this time, the correlational arithmetic operations between V direction projection images of other objects 804, 805 and 806 on the insides of the first and second masking areas are not performed since the masking areas are eliminated from the correlational arithmetic operation area.

Next, the correlational arithmetic operation for the movement detection according to this embodiment will be described in the case the moving object 800 and the other images moved. In FIG. 19B, the moving object 800 shifts in the horizontal direction (right direction) at a shift quantity of +i and in the vertical direction (upper direction) at a shift quantity of +j during time t1 to time t2, and the object 804 on the inside of the masking area 803 at time t1 gets out of the investigation area 801 following the above shift. Also, the object 805 shifts in the upper direction and the object 806 shifts in the right direction with most part thereof being missing.

On the other hand, there is no object on the masking area 802 at time t1 but an image of a white ground. At time t2, objects 807 and 809 come in the frame of the investigation image 801, i.e., on the inside of the masking area 802. These other objects, however, shift, appear or disappear on the insides of the masking areas 802 and 803 to be eliminated from an actual correlational arithmetic operation area, so that the correlational arithmetic operation for the movement detection can be performed only between a projection wave form $b_{t1}$ (at time t1) and a projection wave form $b_{t2}$ (at time t2) in shift quantity of the moving object 800.

The spatial shift quantity of +i between time t1 and t2 is detected as a difference in horizontal direction between the V direction projection wave forms $b_{t1}$ and $b_{t2}$ (the shift quantity of the vertical direction can be also detected from horizontal direction projection wave form in the same manner as the above case). In other words, it can be detected that the moving object 800 shifted in the horizontal direction at the shift quantity of i without influence from the other objects. A setting quantity of the masking areas 802 and 803 is preferably set to about a half to four times as large as the shift quantity of the moving object.

Utilizing the projection outputs of the image and setting the masking areas, unnecessary arithmetic operations can be eliminated and this makes it possible to detect a high S/N ratio at a high speed. The projection output can be obtained only by calculating an accumulated sum of respective pixel values, so that both of digital and analog signal systems can be adopted.

To take an example of an analog system, the calculation has only to add analog values of respective pixels on an image sensor in the vertical (and horizontal) direction in each predetermined block. This is made by an analog arithmetic operation to be performed substantially at real time. Accordingly, in this XY projecting method provided with masking area, the arithmetic operation processing is performed at a speed of one place faster or more in comparison with the block matching method in which a degree of the correlation is obtained from an accumulated error of difference values between separated pixels.

Figure 20B:
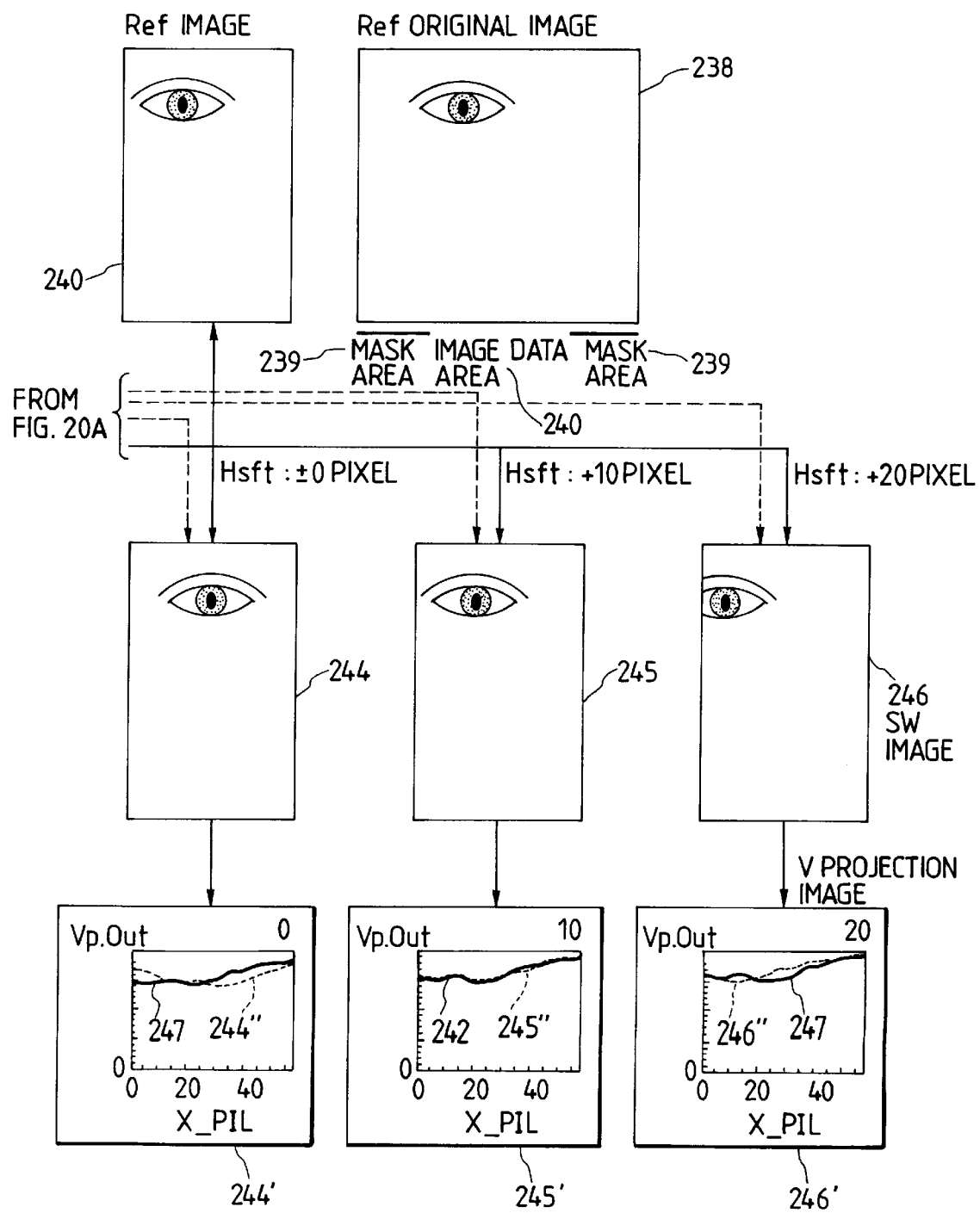
FIG. 20 is comprised of FIGS. 20A and 20B showing diagrams illustrating the results of image simulations actually performed by the movement vector detecting method according to the seventh embodiment of the present invention.

FIGS. 20A and 20B show the results of simulations performed by the movement detecting method of FIGS. 19A and 19B (in case of the movement detection of the horizontal direction using the V projection wave form).

In FIGS. 20A and 20B, masking areas 239 are set at the both ends of a reference original image 238 so as to perform the correlational arithmetic operation and then a reference image 240 for correlational arithmetic operation is formed as a data area except the masking areas 239.

When an image 241 at time t2 is investigated, the investigation image 241 is extracted from the same image frame as that of the reference image 240 (images 242 to 246) to obtain the results 242' to 246' of projection image wave forms 242" to 246" of the images 242 to 246 sampled in space in the same frame as that of the reference image 240 together with respective projection wave forms of the vertical direction 247. The smallest absolute value of differences between the wave forms 247 and the wave forms 242" to 246" is the spatial movement quantity of the horizontal direction. In case of FIGS. 20A and 20B, the positional relationship between the reference image 240 and the investigation image 241 is +10 pixels of the horizontal direction.

Also, in FIGS. 20A and 20B, the masking area is set to 20 pixels that correspond to twice the shift quantity of the moving object. The relationship between the shift quantity and the masking area is preferably set to about 0.5 to 4 times.

(LSI circuit used in the fourth embodiment)

Next, a LSI circuit structure used in the fourth embodiment for performing the above movement detection algorithm of the present invention will be described with reference to FIGS. 21A, 21B and 21C.

An image data matrix 2050 in two-dimensional array (m×n pixels) is a hardware capable of supplying image information from a sensor, a semiconductor memories or CD-ROM in time series. The image information hardware 2050 may supply the image information from the whole pixel in one frame. Assuming now that the pixel data at time t1 are $X_{t1}^{1,1}, X_{t1}^{1,2} \ldots X_{t1}^{1,m}, X_{t1}^{2,1} \ldots X_{t1}^{n,1} \ldots X_{t1}^{n,m}$, respectively. The respective data output the projection image values in the row direction (horizontal direction) and the column direction (vertical direction) by use with accumulation adders 2051 and 2052. As to the description of the projection image outputs of the horizontal direction side and the resultant processing will be omitted since it is performed in the same manner as that of the data processing of the vertical direction side.

The V projection image outputs at time t1 obtained from the accumulation adder 2051 are $$2053\left(=\sum_0^{xk=n} X_{t1}^{xk,1}\right), 2054\left(=\sum_0^{xk=n} X_{t1}^{xk,2}\right), 2055\left(=\sum_0^{xk=n} X_{t1}^{xk,3}\right),$$

$$2056\left(=\sum_0^{xk=n} X_{t1}^{xk,m-2}\right), 2057\left(=\sum_0^{xk=n} X_{t1}^{xk,m-1}\right), 2058\left(=\sum_0^{xk=n} X_{t1}^{xk,m}\right)$$

(although the number of outputs is m since the image data matrix is constituted of m columns, the middle portion will be omitted for brief description). Then, the outputs of m pieces are input to buffers 2059, 2060, 2061, 2062 . . . 2063, 2064, respectively.

Since each switch 2065 is set to B side at time t1, the V projection image outputs of m pieces at time t1 are output respectively to hold circuits 2066, 2067, 2068 . . . 2069, 2070, 2071 to be held in each column.

Next, the V projection image outputs at time t2 are $$2053\left(=\sum_0^{xk=n} X_{t2}^{xk,1}\right), 2054\left(=\sum_0^{xk=n} X_{t2}^{xk,2}\right), 2055\left(=\sum_0^{xk=n} X_{t2}^{xk,3}\right),$$

$$2056\left(=\sum_0^{xk=n} X_{t2}^{xk,m-2}\right), 2057\left(=\sum_0^{xk=n} X_{t2}^{xk,m-1}\right), 2058\left(=\sum_0^{xk=n} X_{t2}^{xk,m}\right).$$

The outputs of m pieces mentioned above are then input to the buffers 2059, 2060, 2061, 2062 . . . 2063, 2064, respectively. The switches 2065 are set to A side by a control signal 2078 at time t2. Therefore, the resultant outputs of m pieces at time t2 are held in each column by hold circuits 2072, 2073, 2074 . . . 2075, 2076, 2077 through the output amplifiers 2059, 2060, 2061, 2062 . . . 2063, 2064. In other words, the V projection image outputs of m pieces at time t1 are held in the hold circuits 2066, 2067, 2068 . . . 2069, 2070, 2071 and the V projection image outputs of m pieces at time t2 are held in the hold circuits 2072, 2073, 2074 . . . 2075, 2076, 2077.

A shift register 2079 is for transfer of investigation image projection data (time t2) and another shift register 2080 is for transfer of reference image projection data (time t1). Also, masking controllers 2081 are for masking part of the reference image at time t1 not to be input to the next arithmetic operation circuit and a start controller 2082 is for determining an arithmetic operation start position and an arithmetic operation shift width of the investigation image.

The masking process performed by the masking controllers 2081 will be described in brief below. Here, an output 2098 of the shift register is input via corresponding inverter 2097 to corresponding NAND gate 2096. The input at the other side of the NAND gate 2096 is connected to the output 2099 of the masking controllers 2081. If the output 2099 is "High (H)", the output 2087 of the above NAND gate 2096 is set to "Low (L)" even though an output 2098 of the above shift register 2080 for reference image projection data is set to either "H" or "L", so that a transfer switch 2101 turns OFF and the following V direction projection data at time t1 held in the holding circuit 2071 is not used for the arithmetic operation.

$$\sum_{0}^{xk=n} X_{t1}^{n,m}$$

On the other hand, when the output 2099 of the above masking controller 2081 is "L", if the output 2098 of the shift register 2080 for reference image projection data is set to "H", the signal line 2087 rise to "H", so that the transfer switch 2101 turns ON to sent the data to an arithmetic operation block.

As mentioned above, masking areas, being not used for the arithmetic operation, can be set optionally by the masking controllers 2081. As an aside, the masking areas are used to be fixed in a predetermined column numbers of the right and left data columns by the controllers 2081. Also, the masking areas can change according to the movement quantity or the like. The shift register 2079 for transfer of investigation image projection data is activated by drive clocks 2083 and 2084 and a start pulse 2085 from a signal generation circuit, not shown. Then, the output 2113 of the start controller 2082 controls the start position of the shift register and the number of times the shift register has turned ON.

FIG. 22 is a diagram showing details of operation block in the case the arithmetic operation for difference absolute value is performed between the reference image projection data at time t1 and the investigation image projection data at time t2. The description will be made based upon the determination conditions that the masking areas were defined by two columns on the right and left hands by the masking controllers 2081.

In FIG. 22, at time t1, held data 2071, 2070 and 2067, 2066 are masked and eliminated from the investigation area. Therefore, based upon the reference image projection data 2068 to 2069 of (m−4) pieces in the reference image projection data series at time t1, data series of (m−4) pieces are transferred and read out of all data 2077 to 2072 in the investigation image projection data series at time t2 to perform the correlational arithmetic operation therebetween. The start controller 2082 shown in FIG. 21C controls the start position and the transfer width of the investigation image data series during the operation of the shift register 2079.

Also, in FIG. 22, the reference image projection data series are masked by two columns on the right and left hands, so that the switch 2105 is turned ON first time the start pulse entered. Then, the data 2113 in the hold circuit 2069 is transferred to a correlator 2113 and the data in the hold circuit 2077 is transferred from the investigation image projection data at time t2 to the correlator 2113 to perform the difference arithmetic operation between the above data in a difference circuit 2114. After that, the absolute value of the resultant difference is obtained in an absolute value circuit 2115 to be input to an accumulation adder 2116.

The shift register turns ON the switches (2105, 2100), (2201, 2102) . . . to sent the data to the correlator 2113 in this order. As a result of one-time shift register control, the arithmetic operation is performed according to the following equation.

$$\sum_{0}^{S=m-4} \left| \sum_{0}^{xk=n} X_{t1}^{xk,3+S} - \sum_{0}^{xk=n} X_{t2}^{xk,S} \right| \qquad (1)$$

The resulting accumulation of m−4 pieces in difference absolute value errors is finally input to a minimum value detection circuit 2117. At this time, the accumulation adder 2116 is reset and then the next start pulse is input.

The next arithmetic operation is started at a point being shifted by one block from the start position of the investigation image projection data to perform the correlational arithmetic operation with the reference image projection data. The shift register turns ON the switches (2105, 2102), (2201, 2104) . . . to transfer the data in due order. As is similar to the preceding operation, a calculated value of the following equation (2) remain as the result of the arithmetic operation.

$$\sum_{0}^{S=m-4} \left| \sum_{0}^{xk=n} X_{t1}^{xk,3+S} - \sum_{0}^{xk=n} X_{t2}^{xk,S+1} \right| \qquad (2)$$

This result is input to the minimum value detection circuit 2117 and compared with the resulting value of the equation (1) to leave a smaller one. When the minimum value is updated, the number of times the investigation image projection data have been shifted is memorized in a movement vector detection counter 2118. After that, the next correlational arithmetic operation is similarly performed by resetting the accumulation adder 2117 and shifting the next start position of the investigation image projection by one block.

Generally, assuming that the projection data array is constituted of m columns and the masking areas are defined by y columns at the right and left ends, the search quantity becomes ±y automatically, so that the correlation data of 2y+1 is calculated from the following equation.

$$\sum_{0}^{S=m-y} \left| \sum_{0}^{xk=n} X_{t1}^{xk,y+1+S} - \sum_{0}^{xk=n} X_{t2}^{xk,S} \right| \qquad (3)$$

The search quantity of 2y+1 was specified so as to prevent positions in the same space, i.e., to include an arithmetic operation for inhibiting the shift between the above positions.

As a result of the series of arithmetic operations, the number of correlation errors is 2y+1 and the minimum value out of these errors is detected by the minimum value detection circuit 2117. Then, as the minimum value is updated, the shift address at the minimum value detection is memorized through the signal line in the detection counter 2118 to output the movement vector of the horizontal direction to an output 2120 of the movement vector detection counter 2118 after end operation of comparison between 2y+1 pieces of the minimum values.

In addition, although the above description was made to illustrate the sequence of the movement vector detection of the horizontal direction relative to the V direction projection image, the movement vector detection of the vertical direction relative to horizontal (H) direction projection image can be detected in the same sequence.

(LSI circuit used in the fifth embodiment)

Figures 23, 23A:
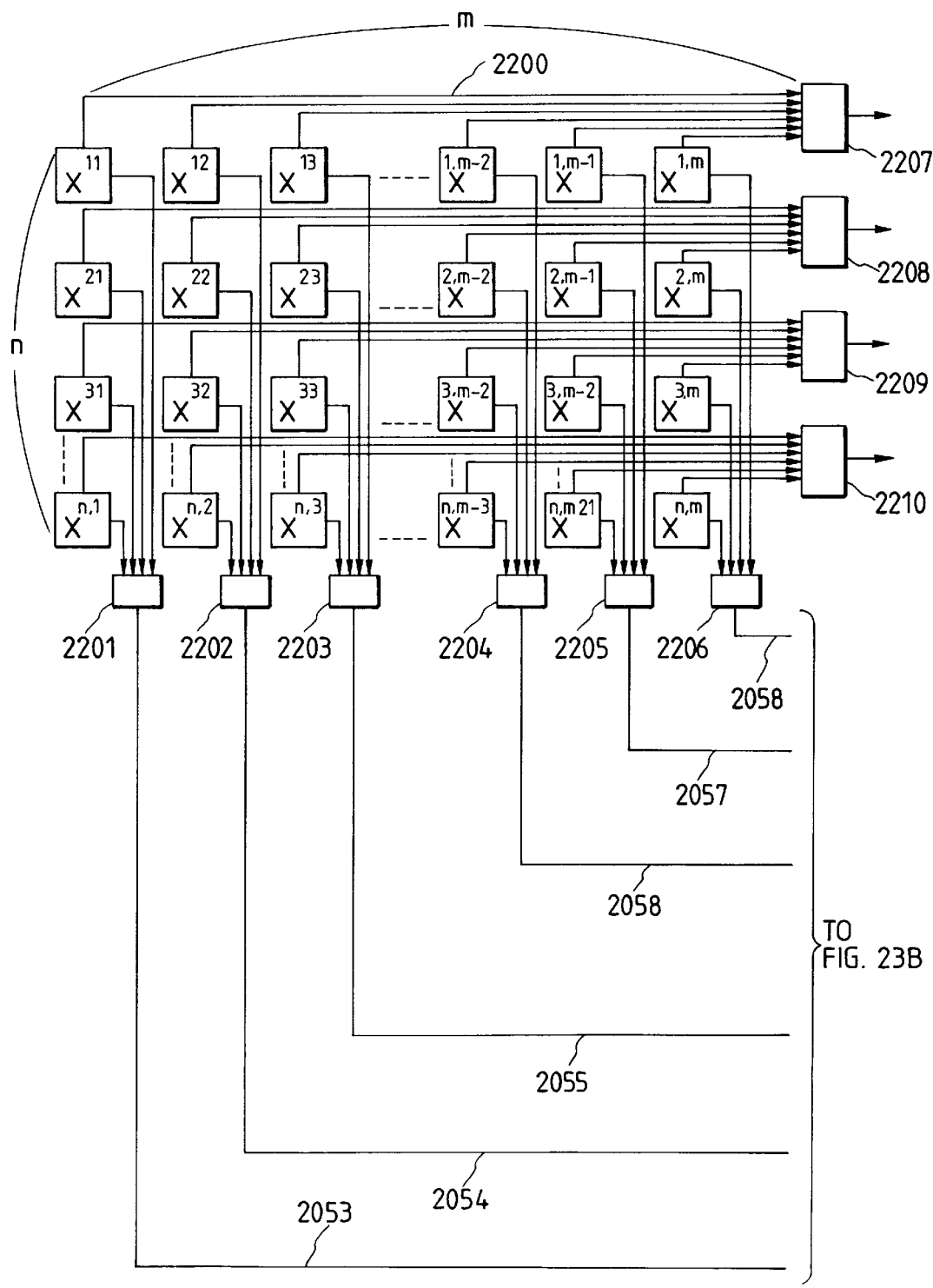
FIG. 23 is comprised of FIGS. 23A, 23B and 23C showing block diagrams illustrating a configuration of the LSI circuit in the fifth embodiment to carry out the movement vector detection according to the present invention.
Figure 23B:
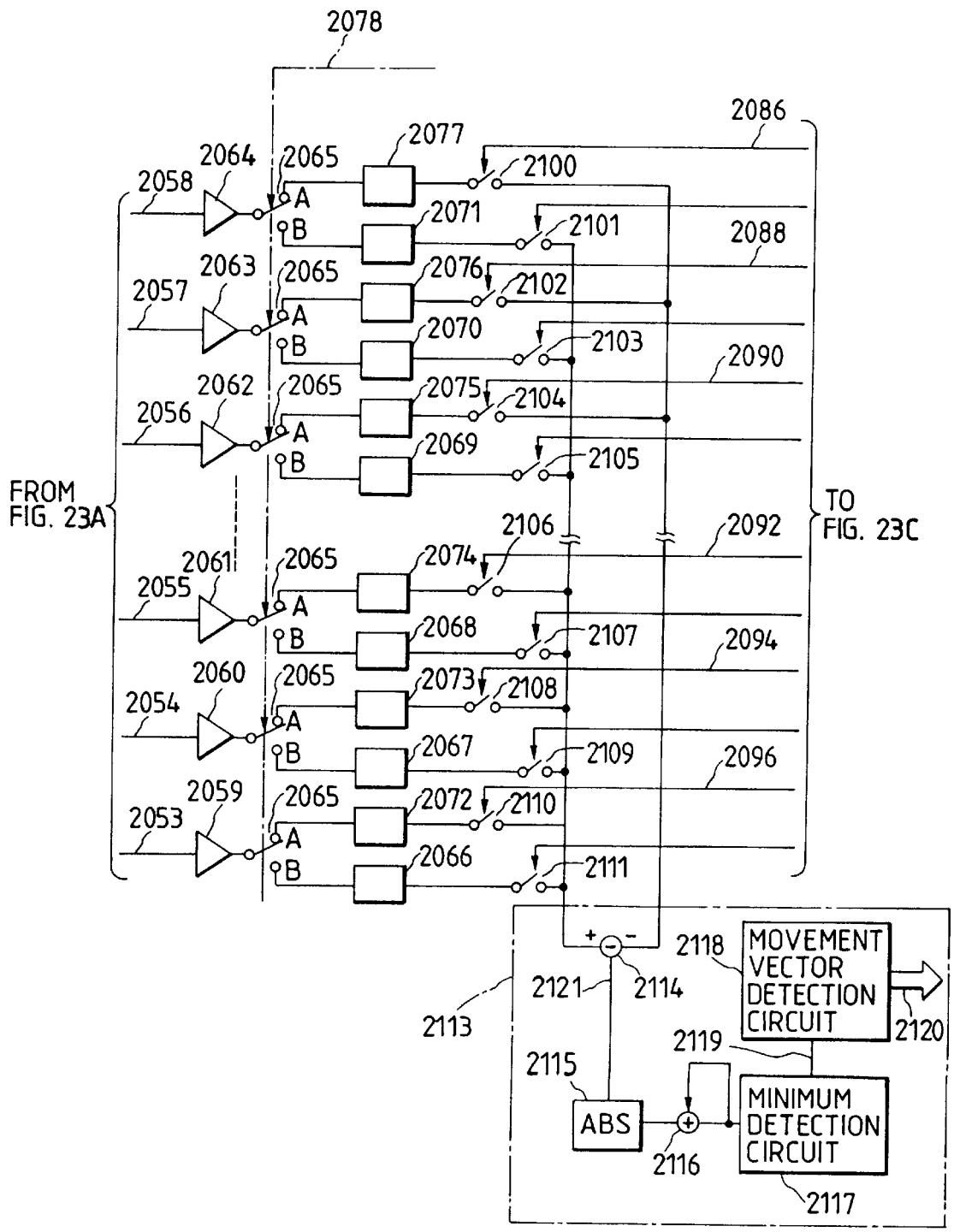
Figure 23C:
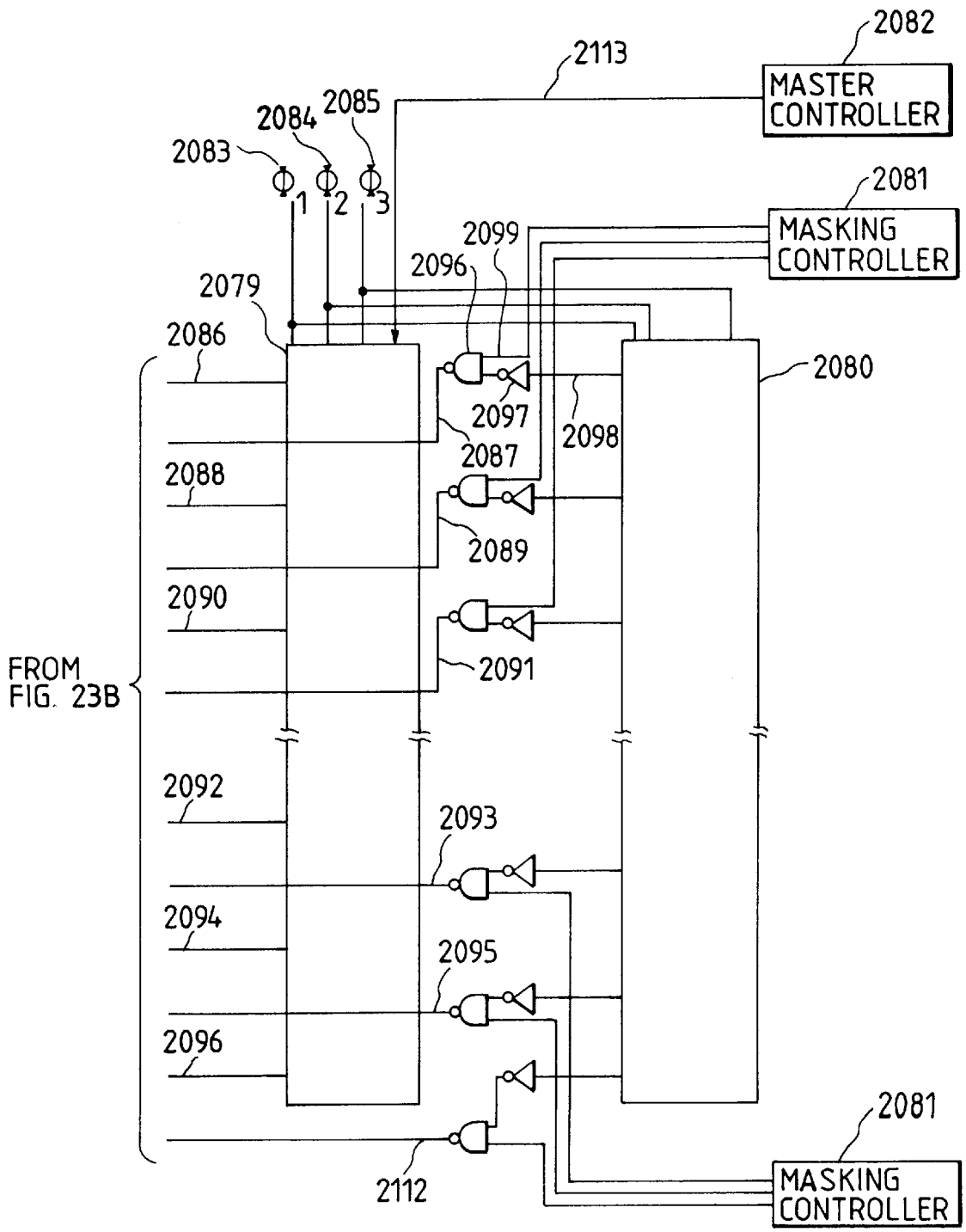

Next, an LSI circuit structure used in the fifth embodiment for performing the above movement detection algorithm of the present invention will be described with reference to FIGS. 23A, 23B and 23C. In FIGS. 23A, 23B and 23C, the same portions as those of FIGS. 21A, 21B and 21C use the same reference numerals to omit those descriptions.

Figure 21B:
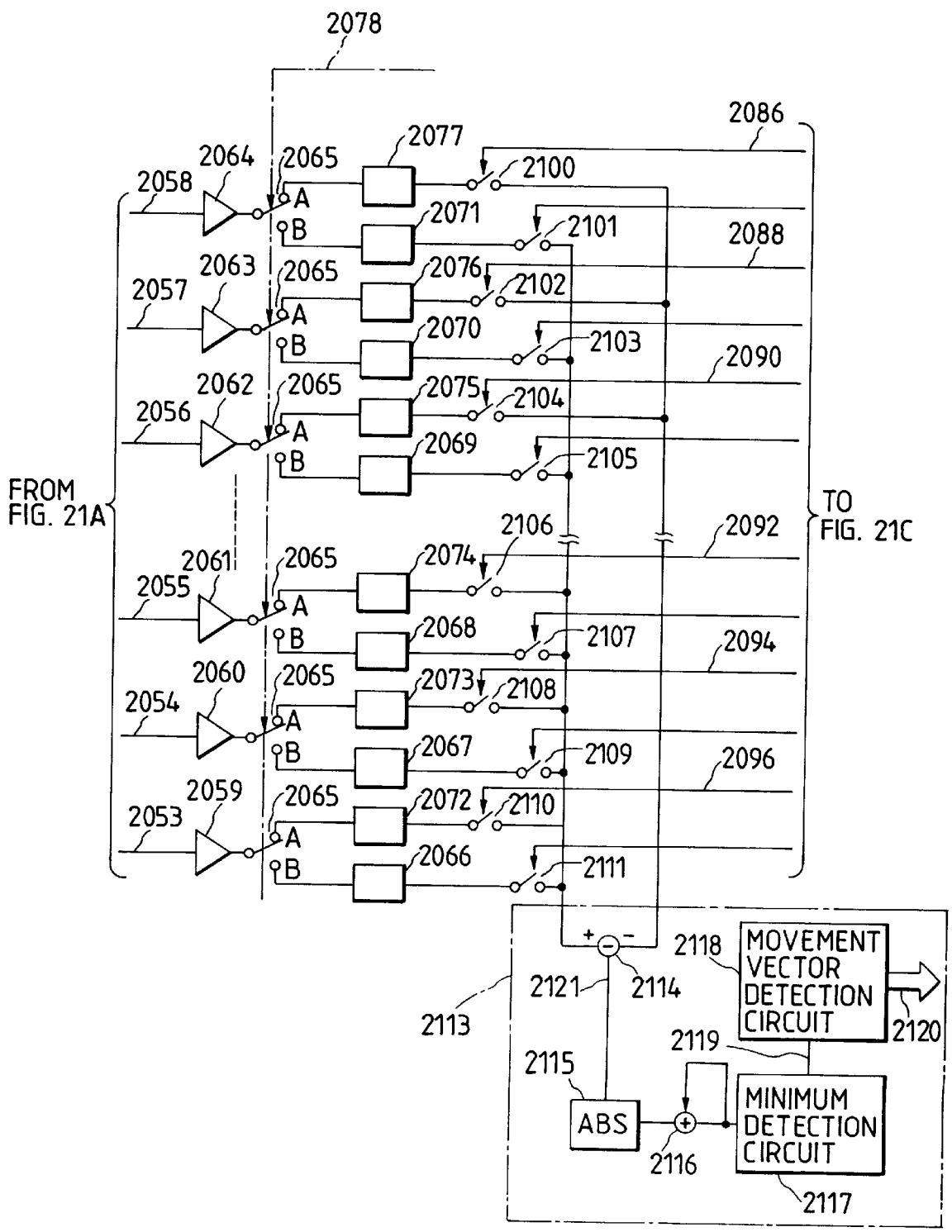
FIG. 21 is comprised of FIGS. 21A, 21B and 21C showing block diagrams illustrating a configuration of the LSI circuit in the fourth embodiment to carry out the movement vector detection according to the present invention.
Figure 21C:
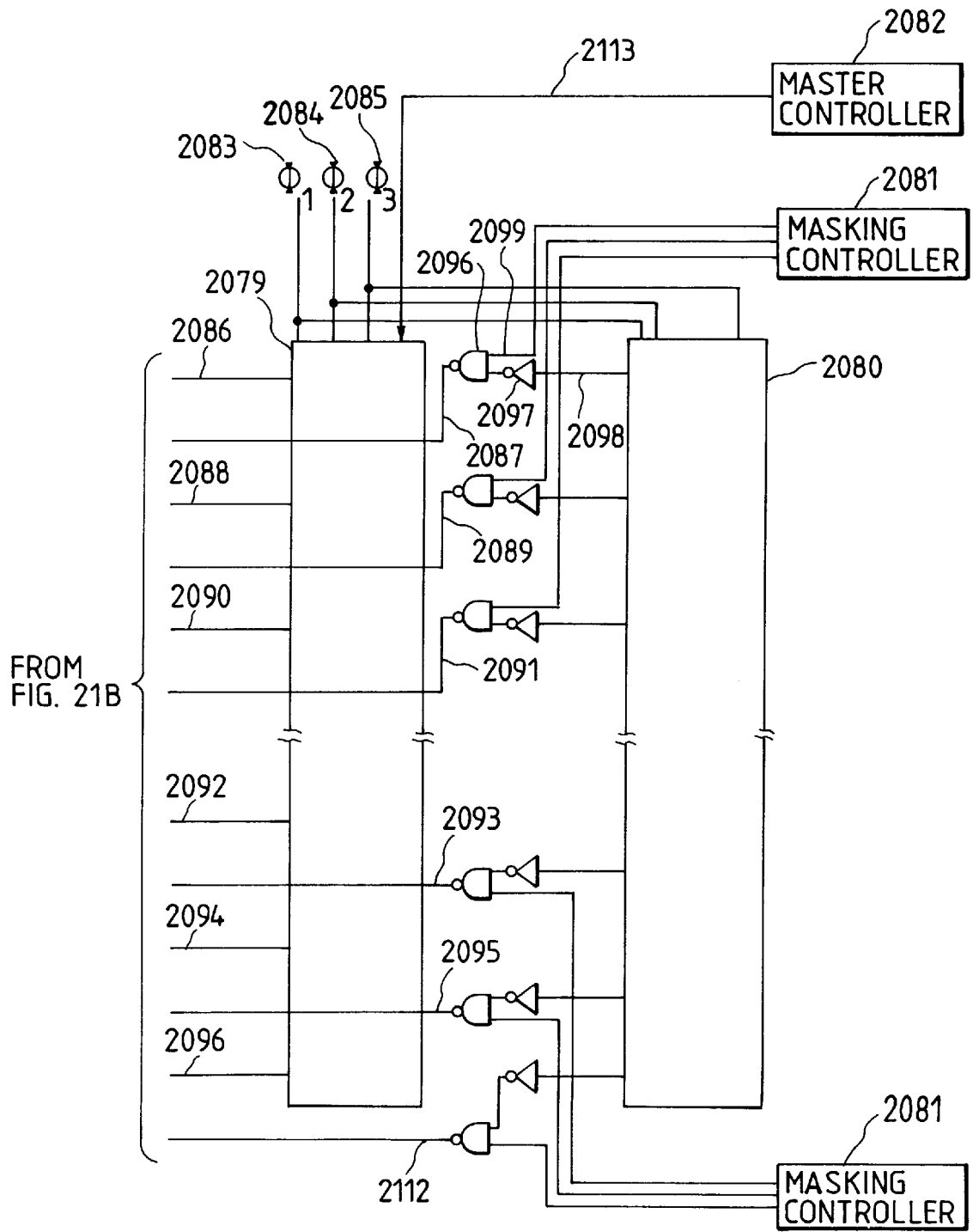

The structure of FIGS. 23A, 23B and 23C differs from that of FIGS. 21A, 21B and 21C in the structural portions of image data matrix 2050 and the accumulation adders 2051 and 2052 for the vertical and horizontal directions. Although the circuit of FIGS. 21A, 21B and 21C is constituted so that the image data matrix transfers pixel values in the vertical and horizontal directions in due order to be added up in the accumulation adders according to time series, the circuit of FIGS. 23A, 23B and 23C is constituted so that an image data matrix 2200 enables random read-out of the pixel values and the read outputs 2201, 2202, 2203 . . . 2204, 2205, 2206 (for V direction projection output) and 2207, 2208, 2209 . . . 2210 (for H direction projection output) are simultaneously added in parallel adders.

For this reason, the generation of projection outputs can be processed at real time and this makes it possible to process the system at a high speed. For the pixel data matrix, a sensor capable of nondeductive read-out and random read-out or a semiconductor memory capable of random access and transfer can be used.

Next, an image sensor which achieves the second LSI circuit used in the fifth embodiment and which is featured by that a plurality of photoelectric converting elements are arranged two-dimentionally and a read-out means capable of parallel read-out of both the outputs from the row directional elements and the outputs from the column directional elements is included therein.

Figure 24:
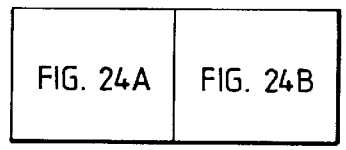
FIG. 24 is comprised of FIGS. 24A and 24B showing block diagrams illustrating a configuration of a sensor part in the LSI circuit according to the fifth embodiment.
Figure 24A:
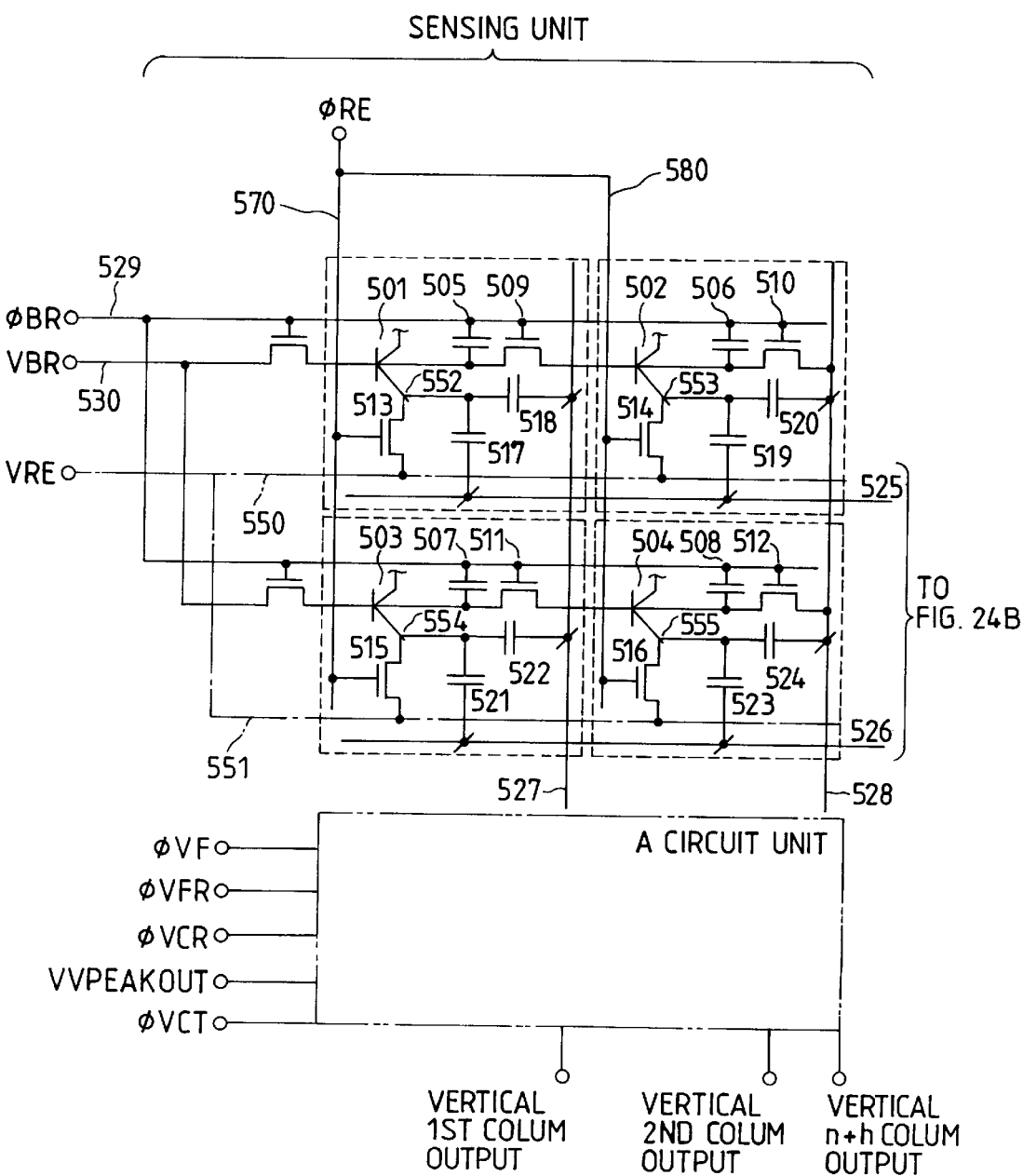
Figure 24B:
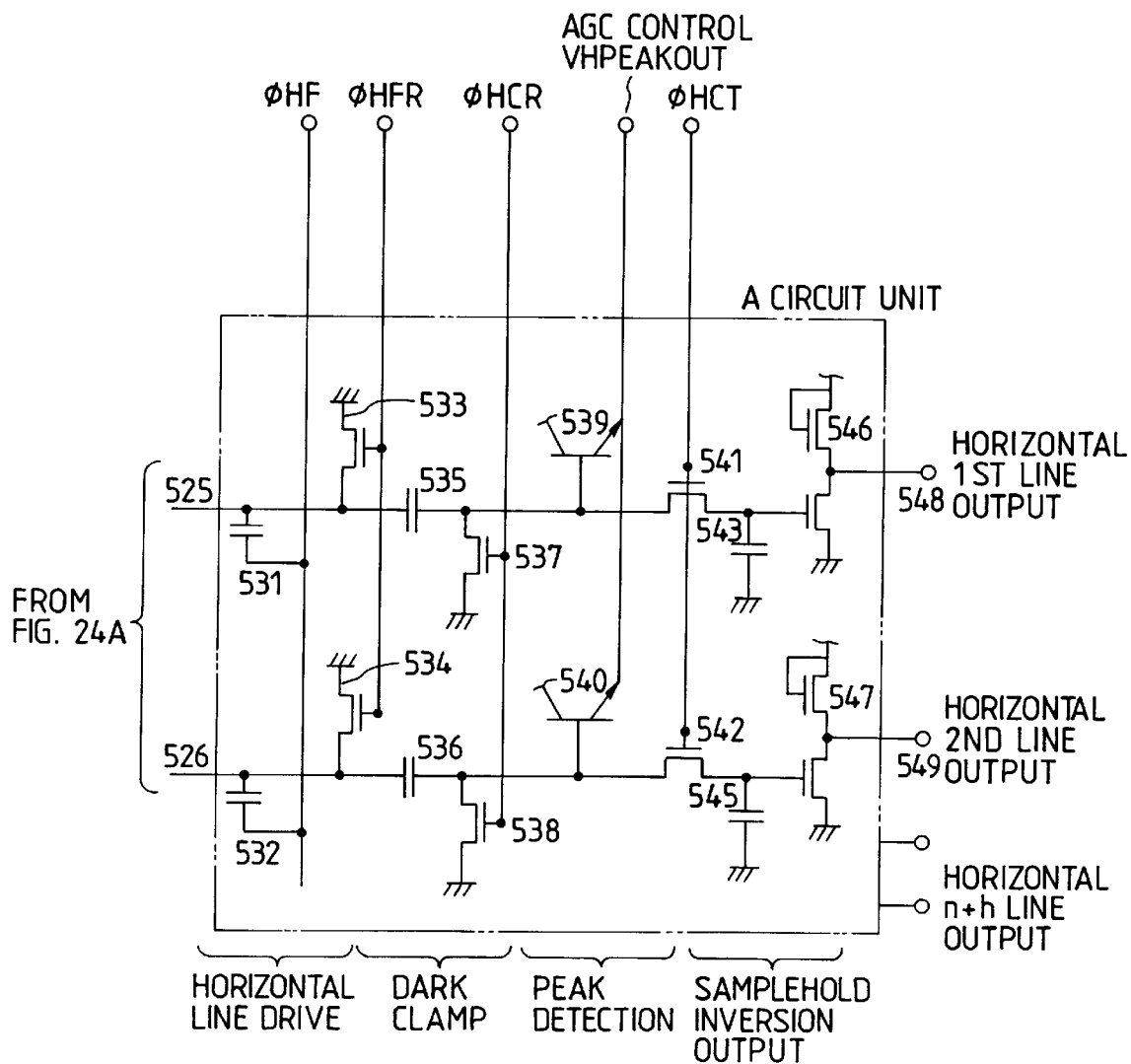

FIGS. 24A and 24B show examples of parallel addition of row and column directions by use with a nondeductive read-out sensor. The sensor shown in FIG. 24A is constituted of 2×2 pixels, but the number of pixels is not limited thereto. Also, in FIG. 24A, bipolar transistors, 501, 502, 503 and 504 are of n-p-n type, respectively. The base region of each bipolar transistor serves as an anode of a photodiode on a photoreceiving layer to accumulate electrons and holes of hole pair on the above base region. The capacitors provided on the base regions 505, 506, 507 and 508 control ON/OFF state of the above bipolar transistors.

P-type MOS switches 509, 510, 511 and 512 are used for separating photoelectric converting cells of the vertical direction to reset respective photodiode potentials. Then, N-type MOS switches 513, 514, 515 and 516 resets respective emitter potentials, the sources of the above MOS switches 513 and 514 are connected with an emitter reset power source line 550 and the sources of the above MOS switches 515 and 516 are connected with an emitter reset power source line 551 as well. The capacitors 517 to 524 are respectively formed between the emitters and floating bus lines 525, 526, 527 and 528.

The capacitors provided on the base regions of the bipolar transistors and PMOS gates discussed above are connected with a drive line 529 from which pulses $\phi_{BR}$ are applied thereto. In this embodiment, the whole pixel is commonly connected therewith. Also, a base reset power source $V_{BR}$ of each bipolar enables to be applied to the bases of all the pixels through a P-type diffusing layer 530.

Next, a read-out circuit structure will be described. In FIG. 24B, only a read-out circuit of the horizontal direction is illustrated. In this embodiment, the data are output simultaneously in the horizontal and vertical directions to each row in parallel with each column, so that the circuit structure of the vertical direction is the same as that of the horizontal direction and the circuit of the vertical direction was not illustrated herein.

Capacitors 531 and 532 are provided for controlling respective potentials of the horizontal floating bus lines 525 and 526 and one side of each capacitor is constituted so that a control pulse $\phi_{HF}$ can be applied. MOS switches 533 and 534 are provided for resetting the potentials of the horizontal floating bus lines 525 and 526 and the gate of each MOS switch is constituted so that a pulse $\phi_{FR}$ can be applied. Parallel capacitors 535 and 536 are provided for potential clamping of the horizontal floating base lines and reset switches 537 and 538 are controlled by a pulse $\phi_{HCR}$, respectively.

Both bases of n-p-n type bipolar transistors 539 and 540 are connected to the output line from the parallel capacitors 535 and 536, respectively, and both emitters thereof are commonly connected to output peak signals of the pixels on the respective horizontal lines to a $V_{HPEAKOUT}$ terminal. Transfer switches 541 and 542 are provided for sample holding capacitors 543 and 545 to be driven by a pulse $\phi_{HCT}$. MOS inverting amplifiers 546 and 547 is provided for outputting outputs 548 and 549.

Next, a driving method for the circuits shown in FIGS. 24A and 24B will be described. First of all, a pulse $\phi_{RE}$ is set to a high level to turn N-type MOS switches 513 to 516 provided at the emitter portions of the pixel cells in an ON state, respectively. Therefore, the emitter potentials thereof are fixed to the power source $V_{RE}$. At the same time, the pulses $\phi_{HFR}$ and $\phi_{HCR}$, $\phi_{HCT}$ are set to the high level to reset the potentials of horizontal floating bus lines 525, 526 and the read-out circuit to be the ground potential, respectively.

In order to reset the base potentials of the bipolar transistors in the pixel portion, a voltage $V_{BR}$ of about 1 to 2 V is then applied to the bases of the bipolar transistors. At this time, if the respective emitters lie in the grounded state, the bipolar transistors of the whole pixel turn ON to cause an excessive current flowing, so that the pulse $\phi_{HFR}$ is changed to a low level once to turn the horizontal bus lines 525 and 526 connected with the respective emitters in the floating state.

After that, the pulse $\phi_{BR}$ is changed from a middle level to the low level to turn the P-type MOS switches 509 to 512 in the pixel portion in the ON state. Therefore, the base potentials thereof are fixed to the potential $V_{RE}$. Such a reset method (complete reset) is performed from the one side through the P-type diffusing layer 530 but it can be performed from the both side of the pixel portion to shorten the reset hours.

After end of the reset operation, the pulse $\phi_{BR}$ is returned to the middle level once and the pulse $\phi_{HFR}$ is set to the high level again to reset the horizontal floating bus lines to the ground potential. Then, the pulse $\phi_{BR}$ is changed to the high level again to focus the base region on the base potential determined by this emitter potential. Therefore, the base potential is risen by the capacitors 505 to 508 provided in respective pixels to bias the bipolar transistors of the whole pixel, being respectively between the base and the emitter of each transistor, in a sequential direction. This can be easily achieved by setting the base fixed potential $V_{BR}$ at the above reset operation to a desired value.

The above reset method is called an excessive reset and its reset operation starts with the current flowing in accordance with biassing the bipolar transistors in the sequential direction, but the electrons injected inversely from the emitter is coupled again with the hole in the base to reduce the base potential rapidly. Accordingly, the reset current is reduced according to an exponential function, so that non-uniformity of the reset potential can be reduced by the above reset operation to obtain an even base potential, thereby reducing the reset noise at the read-out operation.

Next, the pulse $\phi_{RE}$ is changed to the low level to turn the emitters of the pixel portion in the floating state and then the pulses $\phi_{BR}$ and $\phi_{HFR}$ are changed respectively to the middle level and the low level, so that the horizontal floating bus lines 525 and 526 are also turned in the floating state. Further, before accumulation of optical signals, outputs during minimal photoreception (dark) are read out in order to perform clamping in an output level corresponding to minimal photoreception.

For this, the pulse $\phi_{HF}$ that has been left in the high level until then is changed to the low level, so that the horizontal floating bus lines 525 and 526 are directed to the downside through the capacitors 531 and 532. Similarly, the emitters 552, 553, 554 and 555 of the bipolar transistors are also directed to the downside through the capacitors 517, 519, 521 and 523, so that the bipolar transistors are turned again in the ON state to read out a voltage corresponding to the base potential during minimal photoreception.

In order to designate the relationship of voltages on this moment, it is now assumes that the whole capacitance is $C_{HFL1}$, the capacitance of capacitor 517 is $C_{15}$, the capacity $C_{25}$ is $C_{16}$, emitter potential rise voltages applied by the bipolar transistors ON during minimal photoreception is $V_{dark}^{11}$ for the bipolar transistor 501 and $V_{dark}^{21}$ for the bipolar transistor 502 and the capacitance of capacitor 51 is $C_{51}$. Accordingly, a voltage of the floating bus line 525 applied from output during minimal photoreception is obtained from the following equation.

$$\frac{C_{15} V_{dark}^{11}}{C_{HFL1}} + \frac{C_{25} V_{dark}^{21}}{C_{HFL1}} - \frac{C_{51}}{C_{HFL1}} \phi_{HF} \quad (4)$$

Similarly, as to the horizontal floating bus line 526, the voltage applied during minimal photoreception is expressed by $$\frac{C_{35} V_{dark}^{31}}{C_{HFL2}} + \frac{C_{45} V_{dark}^{41}}{C_{HFL2}} - \frac{C_{52}}{C_{HFL2}} \phi_{HF} \quad (5)$$

wherein $C_{35}$ and $C_{45}$ express the capacitances of capacitor 521 and 523, $C_{HFL2}$ is the capacitance of the horizontal floating bus line 526, $V_{dark}^{31}$ and $V_{dark}^{41}$ express emitter side output values corresponding to minimal photoreception respectively in the bipolar transistors 503 and 504 and $C_{52}$ is the capacitance of capacitor 532. In this embodiment, $C_{15}$, $C_{25}$, $C_{35}$ and $C_{45}$ are all set at an equal value, and either $C_{HFL1}$ and $C_{HFL2}$ or $C_{51}$ and $C_{52}$ are also set at an equal value. In other words, $C_{HE} \equiv C_{15} = C_{25} = C_{35} = C_{45}$ and $C_{HC} \equiv C_{51} = C_{52}$, so that $C_{HFL} \equiv C_{HFL1} = C_{HFL2}$. Accordingly, the above equations (4) and (5) are simplified as follows:

$$\frac{C_{HE}}{C_{HFL}}(V_{dark}^{11} + V_{dark}^{21}) - \frac{C_{HE}}{C_{HFL}} \phi_{HF} \quad (4)'$$

$$\frac{C_{HE}}{C_{HFL}}(V_{dark}^{31} + V_{dark}^{41}) - \frac{C_{HE}}{C_{HFL}} \phi_{HF} \quad (5)'$$

Although the output lines at the right side of the parallel capacitors 535 and 536 is fixed to the ground potential by the MOS switches 537 and 538 at the time of reading out the level during minimal photoreception, after focusing the above read-out operation substantially to obtain an unchanged voltage, the pulse $\phi_{HCR}$ is set to the low level to turn the right sides of the parallel capacitors in the floating state, respectively. Then, the pulse $\phi_{FR}$ is set to the high level to reset the horizontal floating bus lines 525 and 526 to the ground potential. At this time, the voltages respectively change to the downside, i.e., to the values obtained from the equations (4)' and (5)', so that the right sides of the parallel capacitors 535 and 536 goes to the voltages as follows:

$$-\frac{K}{C_{HFL}}[C_{HE}(V_{dark}^{11} + V_{dark}^{21}) - C_{HC} \phi_{HF}] \quad (6)$$

$$-\frac{K}{C_{HFL}}[C_{HE}(V_{dark}^{31} + V_{dark}^{41}) - C_{HC} \phi_{HF}] \quad (7)$$

wherein K is a constant defined by the parallel capacitors and the sample holding capacitors, etc.

Then, the pulse $\phi_{HCT}$ is set to the low level to hold the voltages obtained from the above equations (6) and (7) respectively in the sample holding capacitors $C_{111}$ and $C_{112}$. After setting the $\phi_{HCT}$ to the low level, the pulse $\phi_{HF}$ is set to the high level.

Next, before accumulation of optical signals, potentials at the emitters and the bases of the bipolar transistors and potentials on the output lines at the right sides of the parallel capacitors 535 and 536 are all reset in the same manner as that of the read-out operation during minimal photoreception. After end of the above reset operation, optical-signal accumulation operation is started. The pulse $\phi_{BR}$ is set to the middle level rather than the high level, so that the base potential of the bipolar transistors is directed to the negative side. For this reason, the bipolar transistors are all in the OFF state during the accumulation operation to prevent both the emitters being in the floating state and the horizontal floating bus lines from generating the voltage changes. Accordingly, the pulse $\phi_{RE}$ is set to the high level and the pulse $\phi_{HFR}$ is then set to the high level during this accumulation operation, but the above emitters and floating bus lines are not always fixed to the ground potential.

After end operation of the optical signal accumulation, the pulses $\phi_{HFR}$ and $\phi_{HCR}$ are set to low level to turn the horizontal floating bus lines and the output lines at the right sides of the parallel capacitors in the floating state, respectively.

Then, the pulse $\phi_{HF}$ is shaken in the downside, so that the voltages on the horizontal floating lines and at the emitter terminals are shaken downward and the base-emitter bias is applied to the bipolar transistors in the sequential direction to be read out to each emitter terminal. The voltages at the respective emitter terminals become potential differences respectively between the optical signals exposed to the photodiodes that formed on the base regions of the respective bipolar transistors $V_P^{11}$, $V_P^{21}$, $V_P^{31}$, $V_P^{41}$ and the bias output during minimal photoreception $V_{dark}^{11}$, $V_{dark}^{21}$, $V_{dark}^{31}$, $V_{dark}^{41}$. For this reason, the potentials of the respective horizontal floating lines are obtained from the following equations (8) and (9), respectively.

$$\frac{1}{C_{HFL}}[C_{HE}(V_p^{11} + V_{dark}^{11} + V_p^{21} + V_{dark}^{21}) - C_{HC}\phi_{HF}] \quad (8)$$

$$\frac{1}{C_{HFL}}[C_{HE}(V_p^{31} + V_{dark}^{31} + V_p^{41} + V_{dark}^{41}) - C_{HC}\phi_{HF}] \quad (9)$$

Next, when the pulse $\phi_{HFR}$ is set to the high level, each differential change in voltage obtained from the above equations (8) and (9) is read out to a sampling transistor, so that the above differential changes add in the voltages given by the equations (6) and (7). The resulting voltages are given by the following equations (10) and (11), respectively.

$$\frac{K}{C_{HFL}}[C_{HE}(V_p^{11} + V_{dark}^{11} + V_p^{21} + V_{dark}^{21}) - C_{HC}\phi_{HF}] - \quad (10)$$
$$\frac{K}{C_{HFL}}[C_{HE}(V_{dark}^{11} + V_{dark}^{21}) - C_{HC}\phi_{HF}]$$

$$\frac{K}{C_{HFL}}[C_{HE}(V_p^{31} + V_{dark}^{31} + V_p^{41} + V_{dark}^{41}) - C_{HC}\phi_{HF}] - \quad (11)$$
$$\frac{K}{C_{HFL}}[C_{HE}(V_{dark}^{31} + V_{dark}^{41}) - C_{HC}\phi_{HF}]$$

After all, the added outputs of the horizontal direction are read out in parallel as shown in the following equations.

$$\frac{K_{CHE}}{C_{HFL}}(V_p^{11} + V_p^{21}) \quad (12)$$

$$\frac{K_{CHE}}{C_{HFL}}(V_p^{31} + V_p^{41}) \quad (13)$$

In the above operation, the vertical direction is operated in the same manner as that of the horizontal direction, so that the added outputs are read out also in the vertical direction in parallel.

As mentioned above, the vector detection arithmetic operation method performed by the movement vector correlator 2113 of FIG. 21B is based on the minimum value detection between difference absolute values. Next, another correlator using floating gate type MOS transistors will be described with reference to FIG. 25.

Figure 25:
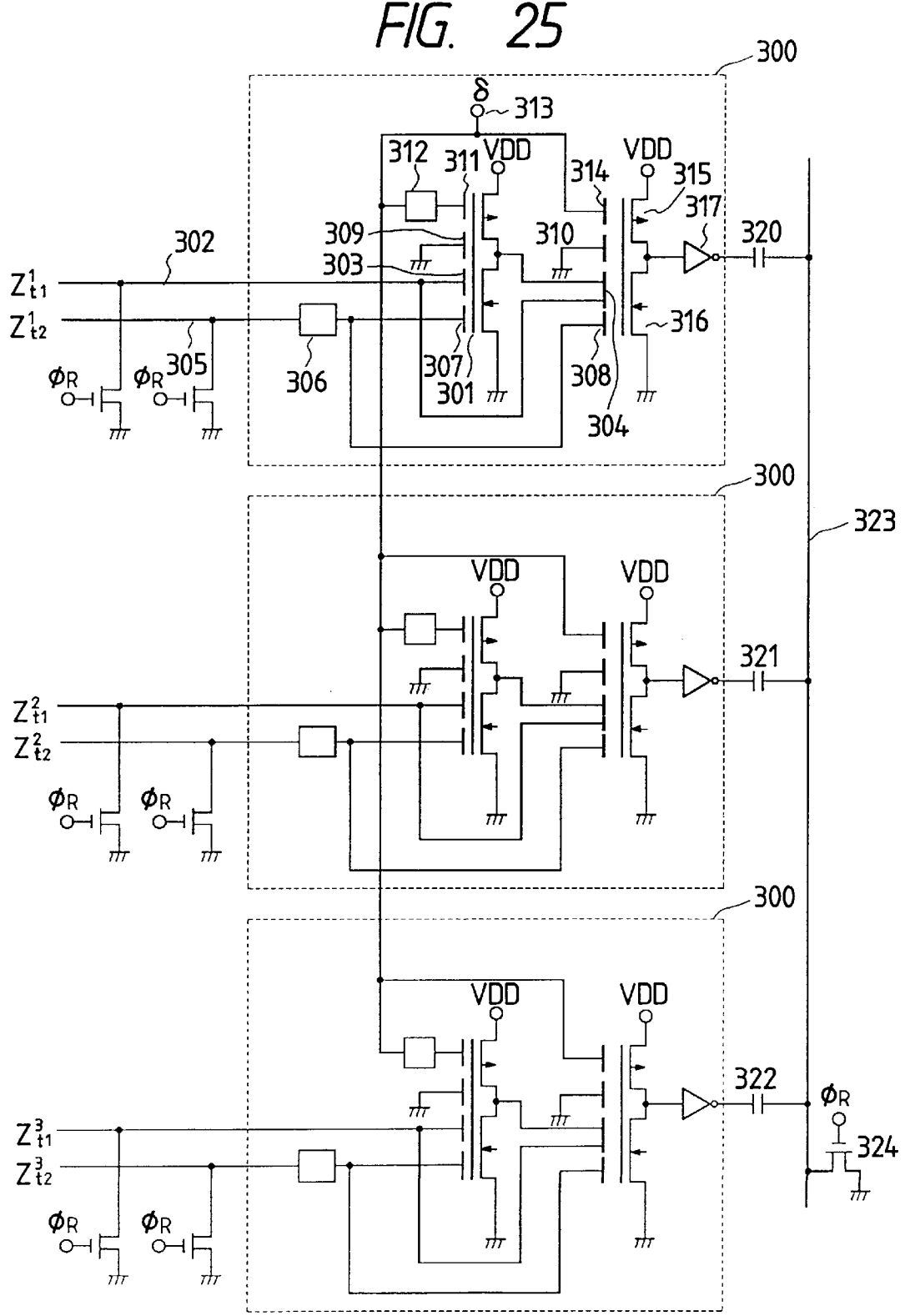
FIG. 25 is a block diagram of a correlator utilizing MOS transistors of floating gate type according to embodiments of the present invention.

In the correlator shown in FIG. 25, the correlation value output is maximized at the time of the correlation error being smallest (at the time of the strongest correlation). The correlator 300 of FIG. 25 outputs "1" if the input absolute value is $|Z_{t1}-Z_{t2}|<\delta$ ($\delta$: voltage), or "0" if it is $|X_{t1}-X_{t2}|\geq\delta$.

Hereinbelow, the operation of the circuit of FIG. 25 will be described. At first, the input lines of the cells are reset once by the pulse $\phi_R$ and turned in the floating state. Then, $Z^1_{t1}$ and $Z^1_{t2}$ are input to an input of the correlator 300. A signal on an output line 302 is input to gates 303 and 304 and another signal on an output line 305 is input through an analog inverting amplifier 306 to gates 307 and 308, respectively out of multi-input gates formed through a floating gate 301.

Figure 26:
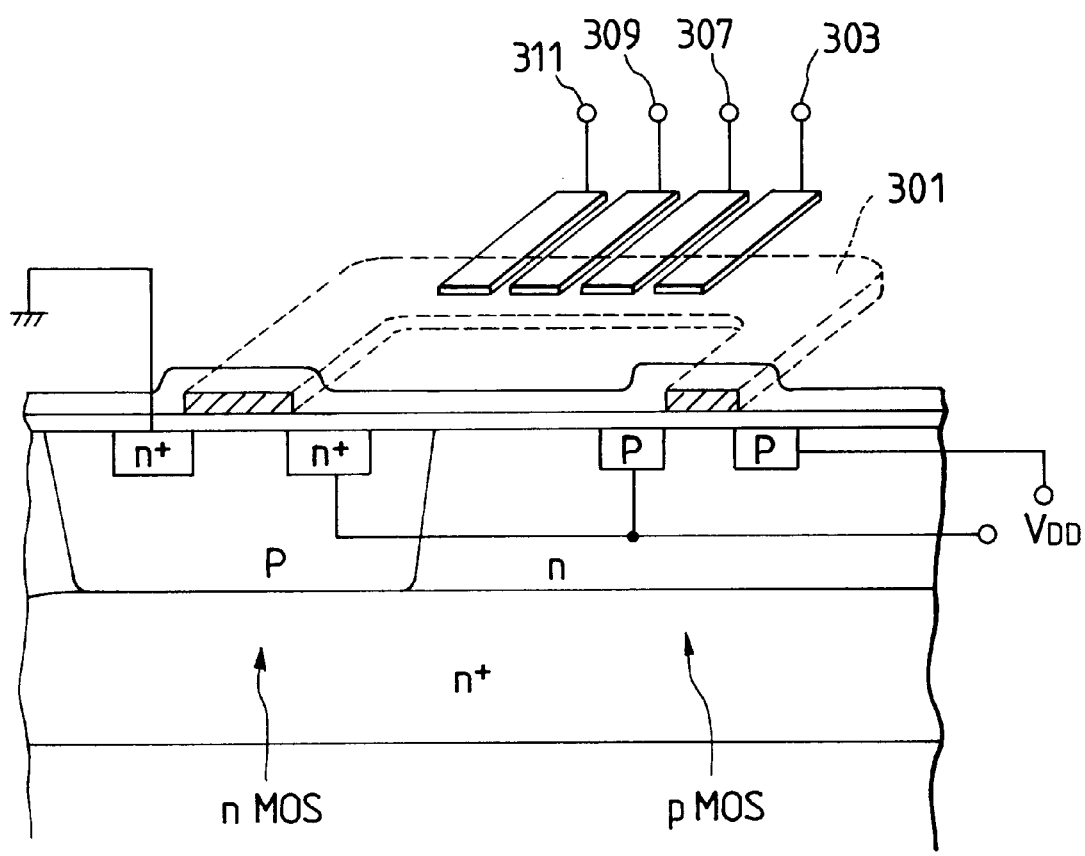
FIG. 26 is a schematic diagram of a semiconductor device with 4 input gates and a floating gate which is used in the correlator 300 of FIG. 25.

On the other hand, gates 309 and 310 are grounded and a gate 311 is connected through an inverting amplifier 312 to a power source 313 for determining a determination condition $\delta$. Then, a gate 314 is directly connected to the power source 313. Reference numeral 315 indicates a p-type MOS transistor and 316 indicates an n-type MOS transistor. In addition, FIG. 26 is a schematic diagram showing a semiconductor device which includes the gates 303, 307, 309, 311 and the floating gate 301 of the circuit 300 shown in FIG. 25. The structure of the semiconductor device is basically the same as that of FIG. 8.

In such a structure, the output through an inverter 317 is set to $V_{DD}$ value in the case the absolute value between the output lines 305 and 302 is less than the voltage $\delta$, or the ground potential is output at the other cases. Accordingly, the determination conditions can be changed by the voltage $\delta$ in the circuit 300.

Analog signals are respectively input to the circuit 300 and the outputs from the circuit 300 are connected with a floating bus output line 323 through capacitors 320, 321 and 322. Before activation of the circuit 300, the output line 323 is grounded by a reset MOS. Then, after the reset transistor 324 was turned OFF and the output line 323 was turned in the floating state, the circuit 300 is activated. For this reason, the respective outputs are automatically added through the capacitors 320, 321 and 322.

Assuming now that the inputs of the correlator 300 are V direction projection data mentioned in FIGS. 21A, 21B and 21C as follows:

$$Z_{t1}^1 = \sum_0^{xk=n} X_{t1}^{xk,3}, \quad Z_{t2}^1 = \sum_0^{xk=n} X_{t2}^{xk,1}, \quad Z_{t1}^2 = \sum_0^{xk=n} X_{t1}^{xk,4}$$

$$Z_{t2}^2 = \sum_0^{xk=n} X_{t2}^{xk,2}, \quad Z_{t1}^3 = \sum_0^{xk=n} X_{t1}^{xk,5}, \quad Z_{t2}^3 = \sum_0^{xk=n} X_{t2}^{xk,3}$$

If the above data are input, the following arithmetic operations are performed simultaneously in parallel, with addition at real time.

$$\text{"1" for } \left|\sum_0^{xk=n} X_{t1}^{xk,3} - \sum_0^{xk=n} X_{t2}^{xk,1}\right| < \delta$$

$$\text{"0" for } \left|\sum_0^{xk=n} X_{t1}^{xk,3} - \sum_0^{xk=n} X_{t2}^{xk,1}\right| \geq \delta$$

$$\text{"1" for } \left|\sum_0^{xk=n} X_{t1}^{xk,4} - \sum_0^{xk=n} X_{t2}^{xk,2}\right| < \delta$$

$$\text{"0" for } \left|\sum_0^{xk=n} X_{t1}^{xk,4} - \sum_0^{xk=n} X_{t2}^{xk,2}\right| \geq \delta$$

$$\text{"1" for } \left|\sum_0^{xk=n} X_{t1}^{xk,5} - \sum_0^{xk=n} X_{t2}^{xk,3}\right| < \delta$$

$$\text{"0" for } \left|\sum_0^{xk=n} X_{t1}^{xk,5} - \sum_0^{xk=n} X_{t2}^{xk,3}\right| \geq \delta$$

The results of the above arithmetic operations are added automatically and simultaneously to form correlation data. Here, if the correlator 300 is constituted by n pieces corresponding to the number of pixels of the V direction, the projection error correlational arithmetic operation for each column and the accumulation of the correlation values can be performed simultaneously in parallel, thereby shortening the arithmetic operation hours extremely.

Next, a maximum value detection circuit utilizing the circuit provided with the floating gate MOS of FIGS. 25 and 26 will be described with reference to FIG. 27.

Figure 27:
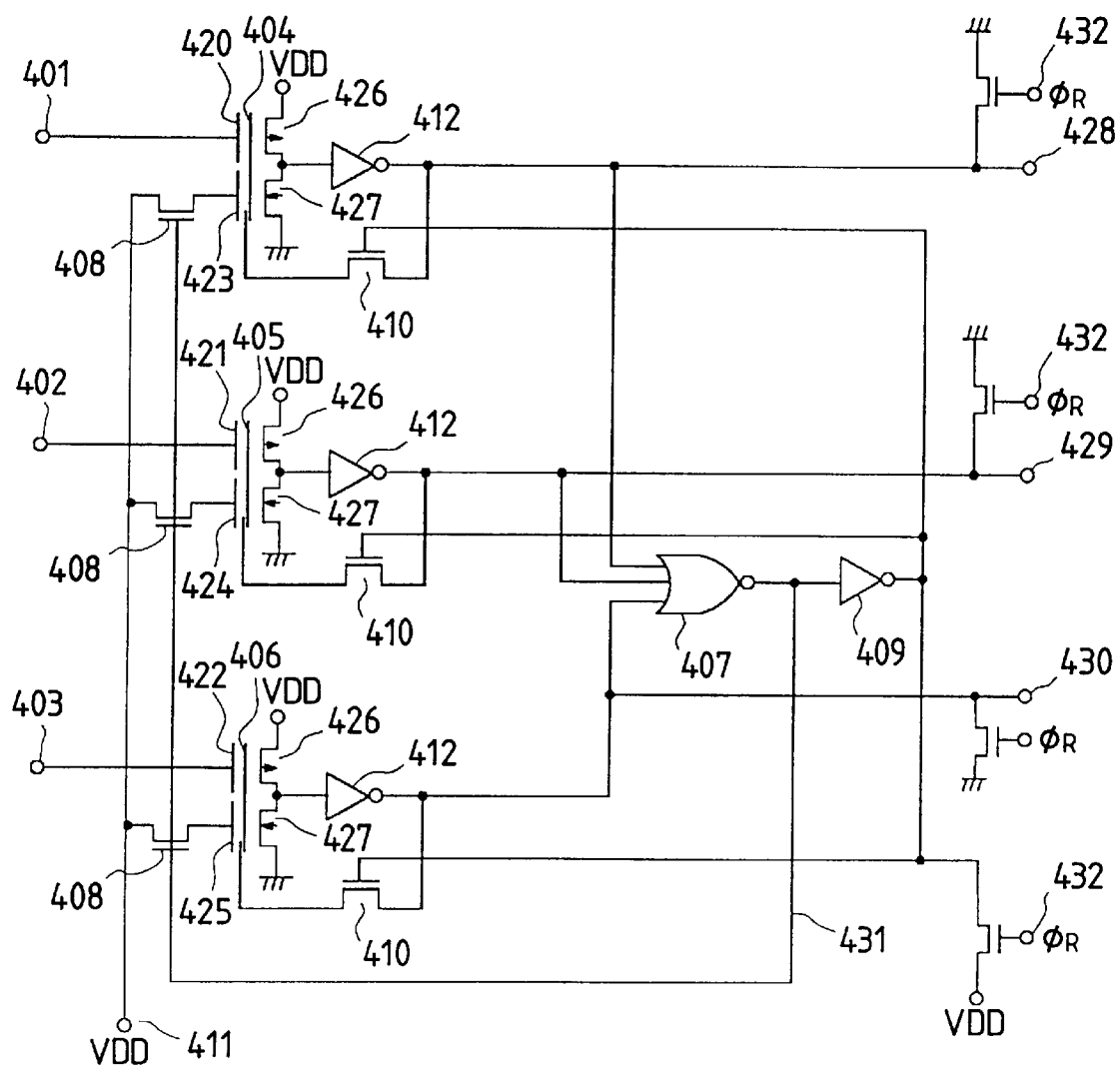
FIG. 27 is a block diagram of a maximum value detection circuit by use with a circuit utilizing the floating gate type MOS shown in FIGS. 25 and 26.

Referring to FIG. 27, at inputs 401, 402 and 403, the results of a series of the arithmetic operations for each shift value, as discussed in FIG. 22, i.e., an added value of the results of determination in the difference absolute value between the V direction projection data at time t1 and t2, are input, respectively. For example, the result of the arithmetic operations by use of the projecting method is input to the input 401 in the case the investigation image projection data series was shifted by +1 pixel relative to the reference image projection data series, the result in case of being shifted by ±0 pixel is input to the input 402 as well and the total correlation value of +1 pixel is input to the input 403.

Such input terminals are connected to input gates 420, 421 and 422, respectively. On the other hand, the other sides of input gates 423, 424 and 425 are connected with a lamp voltage power source 411 through MOS switches 408. The above input gates serve as gates of CMOS inverters, each being constituted of a p-type MOS transistor 426 and an n-type MOS transistor 427, through floating gates 404, 405 and 406.

The outputs of the CMOS inverters are connected to output terminals 428, 429 and 430 through inverters 412 used in general and commonly connected with an NOR 407. An output 431 of the NOR 407 is connected to gates of the MOS switches 408. Also, the outputs of the output terminals 428, 429, 439 and an output of an inverter 409 are connected through reset MOS switches 432 to an installation potential and the $V_{DD}$.

Next, the operation of the maximum value detection circuit will be described below. At first, the pulse φhd Rprior to operation is turned in the high state and each output line is set to the ground potential. On the other hand, the MOS switch 116 is turned ON, so that the potentials of the floating gates 404, 405 and 406 are all reset to the ground potential. Then, the pulse $\phi_R$ is set to the low level to turn the output terminals and the floating gates in the floating state. The output terminals are GND, so that the output of the NOR 407 is in the high state and the gates of the MOS switches 408 are in the ON state. On the other hand, the output of the inverter 409 is in the low state, so that MOS switches 410 are in the OFF state.

Then, when the lamp power source $V_R$ shown by 411 rises from the low level to the high level, the results of the correlational arithmetic operations are input to the terminals 401, 402 and 403 in the state that the terminals have been reset. Therefore, the state is changed from high to low in order from the inverter showing the highest voltage out of the above input values, i.e., the outputs of the inverters 412 change into the high ($V_{DD}$) state. After that, the output of the NOR 407 becomes low and the output of the inverter 409 becomes high, so that the gates of the MOS switches 410 are turned in the ON state.

For this reason, only the output of the inverter that the maximum value was input sets the corresponding floating gate high, while the outputs of the other inverters set the floating gates low. On the other hand, the gate that the clamping voltage was input sets the NOR output low, so that the corresponding MOS switch 408 is turned in the OFF state and the clamping voltage is not applied thereto.

From the operation principle discussed above, only the terminal that the maximum value was input can output the high level and the other terminals output the low level.

The above structure was provided with the MOS switches 408, but those switches are not always required. In this structure, a delay circuit, etc. can be inserted in consideration of the delay of pulses in each operation. Also, utilizing the pulse to input the maximum value and to output the high level, the corresponding unit can be separated from this structure to be extended into a circuit capable of the next maximum value detection.

(Eighth embodiment)

Next, a correlational arithmetic operation processing for movement detection according to an eighth embodiment will be described.

In the first embodiment of the present invention, the movement detection that utilizes the designated masking areas did not basically investigate areas except the search area. In the masking method of FIG. 16, the entire data frame of the reference image 210 was the same as that of the investigation image 211 and the movement vector was detected so that the investigation image 210 is searched from the right end to the left end (or from the left end to the right end) with the same image frame as the data frame 212 of the reference image 210 except the masking areas.

The arithmetic operating method according to the eighth embodiment provides a dummy image frame on the investigation image side other than the investigation image frame to enable searches larger than the investigation image frame, thereby achieving a high S/N ratio.

In FIG. 28, there include a reference image 600 for search and an investigation image 604. On the right and left hands of the reference image 600, masking areas 601 and 603 are provided to extract an arithmetic operation image area 602 used for search from the inside of the reference image. Also, search areas 605 and 606, being newly designated, are provided at the right and left ends of the investigation image area 604. Then, a single gradation data (e.g., all black or all white) or image data according to image gradations of the investigation image data 604 is added onto the investigation side addition image areas 605 and 606. The above investigation side addition image areas 605 and 606 are provided so that the entire search area is constituted of the sum of 601 and 605 (also, 603 and 606), thus enlarging the search area.

Also, when the movement quantity of an image on the arithmetic operation image area is equivalent to that on the masking area 601 (or 603), the above investigation side addition image areas 605 and 606 are provided to search the areas for the image, so that the movement of the image equivalent to or more than that on the masking areas 601 and 603 can be detected.

FIG. 29 shows movement detection error functions detected from image simulations. In FIG. 29, GA indicates the results of the masking method only according to the first embodiment and GB indicates the results of the masking method and this investigation addition image method. Here, a person's image, being shifted by +32 pixels in the horizontal direction (on the right hand), is used as a simulation condition.

In the conditions of GA shown in FIG. 29, the masking areas corresponding to 30 pixels are provided on the reference image of 200×200 pixels and the correlational arithmetic operations are performed between the reference image data length and the investigation image with the same data length as that of the reference image. Since the entire masking area is of 30 pixels, the search quantity of ±30 pixels is obtained, the movement vector of +30 pixels is thus determined by the minimum value detection.

In the conditions of GB shown in FIG. 29, the masking areas corresponding to 30 pixels are provided on the reference image of 200×200 pixels in the same manner as that of the GB and the investigation side addition image areas corresponding to 40 pixels are provided at the investigation image side to add all black data (data value=0). Therefore, the search quantity of 70 pixels, adding 30 pixels (reference image masking areas)+40 pixels (investigation side addition image areas), is obtained and this makes it possible to perform searches larger than the masking areas. The vector showing the minimum value on GB of FIG. 29 is obtained from the shift quantity of +32 pixels and this indicates that the detection can be performed out of the masking areas.

Also, the correlation function going down on the right hand, as shown on GA of FIG. 29, are determined as the movement vector of +32 pixels instead of that of GB in FIG. 29. As mentioned above, by inserting the addition dummy image into the investigation image, the movement detection utilizing the masking method according to the first embodiment can be performed with further high accuracy.

With the circuit structure for performing the above method according to the eighth embodiment, an image data generation circuit for generating an image data (dummy data) has only to be added to the circuit structure of FIGS. 21A through 21C or 23A through 23C, so that the correlational arithmetic operation processing can be controlled by adding the dummy data from the above generation circuit thereto. The above embodiment, however, is only an example at all points and the present invention is not limited thereto.

As described above, according to the respective embodiments of the present invention, in case that a correlational arithmetic operation is performed between a first selection area selected from a first data group and a second selection area selected from a second data group, part of the first selection area is masked to perform the correlational arithmetic operation, based on the first selection area except the masked part, with the same data length between the first selection area and the second selection area. Accordingly, the correlational arithmetic operation can be performed at a high speed and with high accuracy.

Also, in the correlational arithmetic operation, the correlation is detected from an accumulated sum of data respectively obtained from the horizontal direction and the vertical direction other than the masked area, so that the high-speed and high accurate correlation can be detected without improving a clock of a correlation detection circuit.

The movement detection of a high-speed moving object can be also performed by an apparatus according to the present invention with a simple hard structure and at real time in comparison with the conventional art that needed an enormous quantity of arithmetic operation and a wide detection range.

Also, according to the present invention, in case that a correlational arithmetic operation is performed between a first selection area selected from a first data group and a second selection area selected from a second data group, part of the first selection area is masked, dummy data is added to the second selection area, and the correlational arithmetic operation is performed, based on the first selection area except the masked part, with the same data length between the standard first selection area and the second selection area the dummy data added. Accordingly, the correlational arithmetic operation can be performed at a high speed and with high accuracy.

The correlation data can be also handled independently, so that the data compression can be achieved in the preceding process of the data processing.

Also, the apparatus according to the present invention utilizes a distance information other than the movement information, so that various applications using other correlational arithmetic operations, such as pattern recognition, character recognition and identity recognition, can be realized based on the distance information at a high speed and low cost.

What is claimed is:

1. A method for investigating a second data series, corresponding to a first data series in a first data group, from a second data group including the second data series, said method comprising:

a first selecting step of selecting, from the second data group, a first investigation area;

a first thinning step of thinning out data elements in the first investigation area by a first thin out quantity to thereby provide a plurality of first comparing data series;

a first comparing step of comparing the first data series with each of the first comparing data series by calculating respective differences between data elements in the first data series and respective data elements in each of the first comparing data series, comparing each such difference with a first predetermined value to provide first quantized data, and selecting at least one of the plurality of first comparing data series based on the first quantized data;

a second selecting step of selecting, from the second data group, a second investigation area including the selected first comparing data series and excluding any non-selected first comparing data series;

a second thinning step of thinning out data elements in the second investigation area by a second thinning out quantity to thereby provide a plurality of second comparing data series, the second thinning out quantity being no greater than the first thinning out quantity; and a second comparing step of comparing the first data series with each of the second comparing data series by calculating respective differences between data elements in the first data series and respective data elements in each of the second comparing data series, comparing each such difference with a second predetermined value not greater than the first predetermined value to provide second quantized data, and selecting a final data series including at least one of the plurality of second comparing data series based on the second quantized data.

2. A method according to claim 1, wherein said method is applied in movement detection of an image.

3. A method according to claim 1, wherein the first data group and the second data group contain respective image data different in time.

4. A method according to claim 3, wherein the image data in each group was obtained from a series of arithmetic operations on adjacent pixels.

5. A method according to claim 1, wherein the first data group and the second data group contain respective image data formed by different lenses.

6. A method according to claim 5, wherein said method produces a distance image.

7. A method according to claim 1, wherein said first comparing step selects the at least one of the plurality of first comparing data series based on a sum of the first quantized data, and wherein said second comparing step selects the final data series based on a sum of the second quantized data.

8. A semiconductor apparatus for investigating a second data series, corresponding to a first data series in a first data group, from a second data group including the second data series, said apparatus comprising:

first selecting means for selecting, from the second data group, a first investigation area;

first thinning means for thinning out data elements in the first investigation area by a first thin out quantity to thereby provide a plurality of first comparing data series;

first comparing means for comparing the first data series with each of the first comparing data series by calculating respective differences between data elements in the first data series and respective data elements in each of the first comparing data series, comparing each such difference with a first predetermined value to provide first quantized data, and selecting at least one of the plurality of first comparing data series based on the first quantized data;

second selecting means for selecting, from the second data group, a second investigation area including the selected first comparing data series and excluding any non-selected first comparing data series;

second thinning means for thinning out data elements in the second investigation area by a second thinning out quantity to thereby provide a plurality of second comparing data series, the second thinning out quantity being no greater than the first thinning out quantity; and second comparing means for comparing the first data series with each of the second comparing data series by calculating respective differences between data elements in the first data series and respective data elements in each of the second comparing data series, comparing each such difference with a second predetermined value not greater than the first predetermined value to provide second quantized data, and selecting a final data series including at least one of the plurality of second comparing data series based on the second quantized data.

9. A semiconductor apparatus according to claim 8, wherein a circuit structure including said first selecting means, said first thinning means and said first comparing means is the same as a circuit structure including said second selecting means, said second thinning means and said second comparing means.

10. A semiconductor apparatus according to claim 9, wherein said circuit structure operates on digital data and analog data.

11. A semiconductor apparatus according to claim 9, wherein said circuit structure includes an insulating gate type field effect transistor having a plurality of floating gates.

12. A semiconductor apparatus according to claim 8, wherein said apparatus produces a distance image and comprises a distance image processing circuit, a RAM and a determination circuit incorporating said first selecting means, said first thinning means, said first comparing means, said second selecting means, said second thinning means and said second comparing means.

13. A semiconductor apparatus according to claim 8, wherein said first comparing means selects the at least one of the plurality of first comparing data series based on a sum of the first quantized data, and wherein said second comparing means selects the final data series based on a sum of the second quantized data.

* * * * *

UNITED STATES PATENT AND TRADEMARK OFFICE
CERTIFICATE OF CORRECTION

PATENT NO.   : 6,160,900
DATED        : December 12, 2000
INVENTOR(S)  : Mamoru Miyawaki et al.

Page 1 of 1

It is certified that error appears in the above-identified patent and that said Letters Patent is hereby corrected as shown below:

Column 5,
Line 2, "Xij;" should read -- Xij --.

Column 9,
Line 1, "8" should read -- $\delta$ --;
Line 3, "6." should read -- $\delta$. --.

Column 12,
Line 66, "respective" should read -- respect --.

Column 16,
Line 56, "$a_{12}$" should read -- $a_{t2}$ --.

Column 23,
Line 37, "assumes" should read -- assumed --;
Line 38, "capacity" should read -- capacitance --.

Column 27,
Line 27, "$\Phi$ hd Rprior-" should read -- $\Phi_R$ prior- --.

Signed and Sealed this

Thirteenth Day of November, 2001

Attest:

NICHOLAS P. GODICI
Attesting Officer      Acting Director of the United States Patent and Trademark Office